(12) United States Patent
Thangapalam et al.

(10) Patent No.: US 9,612,769 B1
(45) Date of Patent: Apr. 4, 2017

(54) METHOD AND APPARATUS FOR AUTOMATED MULTI SITE PROTECTION AND RECOVERY FOR CLOUD STORAGE

(71) Applicant: EMC Corporation, Hopkinton, MA (US)

(72) Inventors: Stalin Saravanakumar Thangapalam, Shrewsbury, MA (US); Ian D. Bibby, Waldorf, MD (US); William J. Elliott, IV, Holden, MA (US); Anoop Ninan, Milford, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 109 days.

(21) Appl. No.: 14/319,757

(22) Filed: Jun. 30, 2014

(51) Int. Cl.
*G06F 11/00* (2006.01)
*G06F 3/06* (2006.01)
*G06F 11/14* (2006.01)

(52) U.S. Cl.
CPC ............ *G06F 3/065* (2013.01); *G06F 3/0619* (2013.01); *G06F 3/0683* (2013.01); *G06F 11/1458* (2013.01)

(58) Field of Classification Search
USPC ........................................................ 714/4.11
See application file for complete search history.

(56) References Cited

U.S. PATENT DOCUMENTS

| | | | | |
|---|---|---|---|---|
| 7,325,110 B2* | 1/2008 | Kubo | ................ | G06F 11/1466 711/100 |
| 7,770,059 B1* | 8/2010 | Glade | ................ | G06F 11/0712 709/213 |
| 8,335,771 B1* | 12/2012 | Natanzon | .......... | G06F 17/30008 707/684 |
| 8,706,960 B1* | 4/2014 | Ives | ...................... | G06F 3/0617 711/114 |
| 8,898,507 B1* | 11/2014 | Crable | ................ | G06F 11/1484 714/4.11 |
| 2006/0161810 A1* | 7/2006 | Bao | ...................... | G06F 11/2082 714/6.12 |
| 2007/0088929 A1* | 4/2007 | Hanai | ................... | G06F 3/0605 711/165 |
| 2007/0239944 A1* | 10/2007 | Rupanagunta | ........ | G06F 3/0613 711/147 |
| 2007/0271313 A1* | 11/2007 | Mizuno | ............... | G06F 11/1662 |
| 2010/0199040 A1* | 8/2010 | Schnapp | ............... | G06F 3/0605 711/114 |
| 2011/0072225 A1* | 3/2011 | Kawaguchi | .......... | G06F 3/0605 711/162 |
| 2012/0254566 A1* | 10/2012 | Clayton | ................. | G06F 12/16 711/162 |
| 2012/0260051 A1* | 10/2012 | Maki | ..................... | G06F 3/0611 711/162 |
| 2013/0103650 A1* | 4/2013 | Natanzon | .......... | G06F 17/30008 707/684 |
| 2014/0325149 A1* | 10/2014 | Misra | .................... | G06F 3/0619 711/114 |

(Continued)

*Primary Examiner* — Amine Riad
(74) *Attorney, Agent, or Firm* — Krishnendu Gupta; Robert Kevin Perkins; Andre Gibbs

(57) ABSTRACT

Example embodiments of the present invention provide a method, a system, and a computer program product for creating volumes with data protection. The method includes receiving parameters for creation of a source volume for a host and creating the source volume with data protection according to the received parameters.

15 Claims, 26 Drawing Sheets

(56) References Cited

U.S. PATENT DOCUMENTS

2014/0359243 A1* 12/2014 Byrd .................. G06F 3/0629
   711/170
2014/0380014 A1* 12/2014 Moyer .................. G06F 3/067
   711/170

* cited by examiner

METHOD AND APPARATUS FOR AUTOMATED MULTI SITE PROTECTION AND RECOVERY FOR CLOUD STORAGE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

RELATED APPLICATIONS

This Application is related to U.S. patent application Ser. No. 13/630,455 entitled "SINGLE CONTROL PATH", Ser. No. 13/631,030 entitled "METHOD AND APPARATUS FOR FEDERATING A PLURALITY OF ONE BIG ARRAYS", Ser. No. 13/631,039 entitled "METHOD AND APPARATUS FOR AUTOMATED INFORMATION LIFE-CYCLE MANAGEMENT USING A FEDERATION OF ARRAYS", Ser. No. 13/631,055 entitled "METHOD AND APPARATUS FOR FEDERATED IDENTITY AND AUTHENTICATION SERVICES", Ser. No. 13/631,190 entitled "APPLICATION PROGRAMMING INTERFACE", Ser. No. 13/631,214 entitled "AUTOMATED POLICY BASED SCHEDULING AND PLACEMENT OF STORAGE RESOURCES", and Ser. No. 13/631,246 entitled "DISTRIBUTED SYSTEM SOFTWARE INFRASTRUCTURE" filed on Sep. 28, 2012; Ser. No. 13/886,644 entitled "STORAGE PROVISIONING IN A DATA STORAGE ENVIRONMENT", Ser. No. 13/886,786 entitled "DISTRIBUTED WORKFLOW MANAGER", Ser. No. 13/886,789 entitled "PORT PROVISIONING SYSTEM", Ser. No. 13/886,892 entitled "SCALABLE INDEX STORE", Ser. No. 13/886,687 entitled "STORAGE PROVISIONING IN A DATA STORAGE ENVIRONMENT", and Ser. No. 13/886,915 entitled "SCALABLE OBJECT STORE" filed on May 3, 2013; and Ser. No. 14/315,438, entitled "GLOBAL STORAGE RESOURCE MANAGEMENT", Ser. No. 14/319,772, entitled "METHOD AND APPARATUS FOR AUTOMATED ORCHESTRATION OF LONG DISTANCE PROTECTION OF VIRTUALIZED STORAGE", Ser. No. 14/319,777, entitled "METHOD AND APPARATUS FOR HIGHLY AVAILABLE STORAGE MANAGEMENT USING STORAGE PROVIDERS", Ser. No. 14/319,797, entitled "METHOD AND APPARATUS FOR AUTOMATED SELECTION OF A STORAGE GROUP FOR STORAGE TIERING", Ser. No. 14/319,804, entitled "METHOD AND APPARATUS FOR STORAGE MANAGEMENT USING VIRTUAL STORAGE ARRAYS AND VIRTUAL STORAGE POOLS", and Ser. No. 14/313,104, entitled "STORAGE PORT ALLOCATION BASED ON INITIATOR USAGE" filed on even date herewith, which are hereby incorporated herein by reference in their entirety.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

SUMMARY

Example embodiments of the present invention relate to a method, a system, and a computer program product for creating volumes with data protection. The method includes receiving parameters for creation of a source volume for a host and creating the source volume with data protection according to the received parameters.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
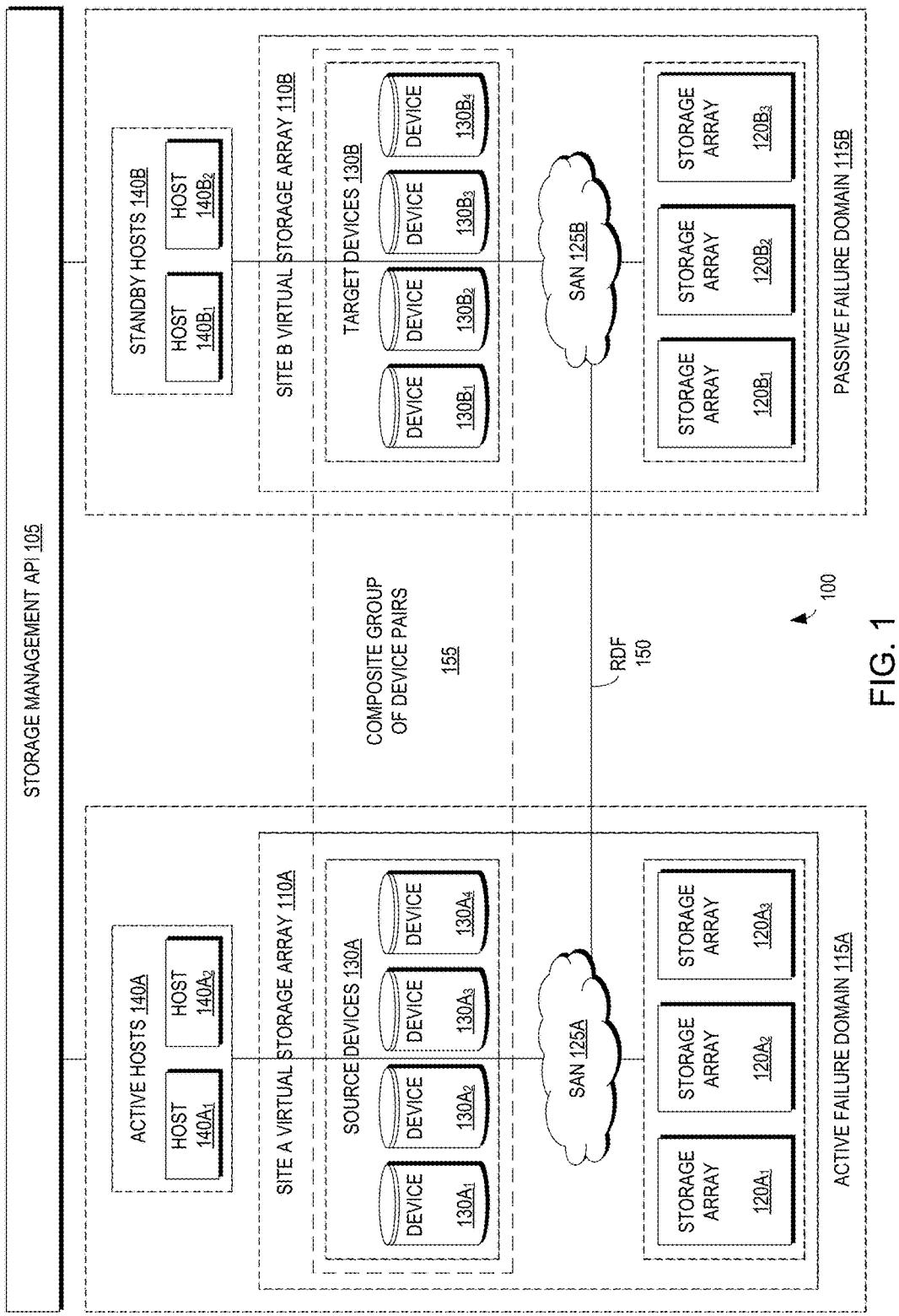
FIG. 1 is a block diagram of a system according to an example embodiment of the present invention including a composite group of device pairs replicated from a first virtual storage array in an active failure domain to a second virtual storage array in a passive failure domain.

Computer systems may include different resources used by one or more host processors. Resources and host processors in a computer system may be interconnected by one or more communication connections. These resources may include, for example, data storage devices such as those included in the data storage systems manufactured by EMC Corporation of Hopkinton, Mass. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations. Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Two components having connectivity to one another, such as a host and a data storage system, may communicate using a communication connection. In one arrangement, the data storage system and the host may reside at the same physical site or location. Techniques exist for providing a remote mirror or copy of a device of the local data storage system so that a copy of data from one or more devices of the local data storage system may be stored on a second remote data storage system. Such remote copies of data may be desired so that, in the event of a disaster or other event causing the local data storage system to be unavailable, operations may continue using the remote mirror or copy.

In another arrangement, the host may communicate with a virtualized storage pool of one or more data storage systems. In this arrangement, the host may issue a command, for example, to write to a device of the virtualized storage pool. In some existing systems, processing may be performed by a front end component of a first data storage system of the pool to further forward or direct the command to another data storage system of the pool. Such processing may be performed when the receiving first data storage system does not include the device to which the command is directed. The first data storage system may direct the command to another data storage system of the pool which includes the device. The front end component may be a host adapter of the first receiving data storage system which receives commands from the host. In such arrangements, the front end component of the first data storage system may become a bottleneck in that the front end component processes commands directed to devices of the first data storage system and, additionally, performs processing for forwarding commands to other data storage systems of the pool as just described.

Often cloud computing may be performed with a data storage system. As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation," a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers.

Typically, storage (or data) protection is provided by any of a series of technologies that makes a copy of an original set of data to target devices. Generally, the copy of the data may be used if an event such as data failure occurs such as, for example, when the original copy of data is destroyed, corrupted, or otherwise unavailable. Conventionally, different strategies may be used to provide data protection for different types of failures that can occur. Usually, some strategies are continuous (source and targets are kept in sync), while others are simply refreshed periodically.

Current solutions to deploy such data protection strategies are predominantly documented procedures that must be executed by an IT professional each time a request for new storage is submitted. Similarly, typical clean-up of such resources is also a documented procedure, but is conventionally neglected until storage or protection resources become scarce. Conventionally, a request to create a new two terabyte volume replicated volume, there may be twenty-four steps for a typical IT administrator. Conventional techniques also may require manipulation of several different APIs (Solutions Enabler API, switch) and GUIs. Usually, partially automated solutions to parts of the strategy are sometimes written in the form of executable scripts that are built in-house or by a service professional that is tailor-made to the specific infrastructure and needs of the datacenter. Generally, the solutions are difficult to maintain and inflexible to the constantly-changing datacenter.

In certain embodiments, the current disclosure may enable creation of an ecosystem of centralized global datacenter management, regardless of the storage manufacturer, protocol, and geographic disparity. In some embodiments, an IT professional may be enabled to configure a datacenter to leverage a unified management platform to perform various tasks via one interface, such as a web portal, without having to use different element managers or CLIs. In certain embodiments, an API may be enabled that can automatically create a protected storage volume on a source site replicated on a target volume on a target site.

In most embodiments, the current disclosure enables the process of creating a replicated volume with a simple set of input. In some embodiments, the inputs may include such as where the volume should exist and how the volume should be protected. In at least some embodiments, a storage management API is enabled to discover which replication appliances are connected to which storage arrays. In other embodiments, a storage management API may be able to determine what storage arrays or storage pools are able to satisfy which storage requests. In further embodiments, a storage management API may be able to create volumes to satisfy a storage request sent to the storage array. In at least some embodiments, creating volumes may include creating a volume at both the source and target site as well as creating supplemental volumes, such as journal volumes, for replication. In certain embodiments, the API may orchestrate creating zones for storage arrays and replication appliances. In other embodiments, the orchestration API may be enabled to mask created volumes to a respective replication appliance cluster node. In still other embodiments, the storage management API may create consistency groups for the replication appliance.

In some embodiments, the functionality orchestrated by the storage management API may be performed in parallel. In other embodiments, cluster load-balancing within the logical array cluster may be enabled. In a particular embodiment, when creating 20 volumes, the request to create each volume may occur in parallel. In most embodiments, the orchestration of each sub-step may be carried out in an order-dependent and efficient way. In most embodiments, this may ensure the source volume(s) is created in an efficient manner.

In other embodiments, system configuration may be enabled to provide data protection in an automated fashion without requiring a user to specify the details of such a configuration. In most embodiments, a user may define operational and service requirements and the techniques of the current disclosure may enable the system to be configured to meet the user's operational and service requirements. In certain embodiments, the current disclosure may enable a unified approach to handle the several layers of abstraction in the mapping an applications to a disk.

In at least some embodiments, the current disclosure may enable the automation of storage protection. In most embodiments, the current disclosure may enable engine to orchestrate of a series of steps that create and protect storage across heterogeneous storage technologies via a varied selection of protection mechanisms. In most embodiments, the current disclosure may enable improved levels of data protection through policy controls and automation of protection tasks of customers' storage. In some embodiments, the current disclosure may enable replacement of a plethora of traditional IT-generated scripts and manual documented procedures.

In certain embodiments, the current disclosure may free administrators from manually creating data protection for thousands of LUNS and volumes across hundreds of systems by automating these tasks. In some embodiments, components of IT environments such as storage arrays, protection appliances, storage switches, and IP networks may be consolidated into a single framework presenting a comprehensive view of the data protection environment. In at least some embodiments, an API may provide connectivity mappings of storage arrays and protection appliances, allowing user interfaces to enforce good decision-making on the part of the requester. In alternative embodiments, a UI may masks the complexity of configuring and managing underlying tasks such as zoning, volume creation, and protection enablement. In other embodiments, an IT professional or cloud consumer may be able to implement protection of a storage environment without the burden of storage level tasks.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by a Remote Data Facility (RDF). With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF Directors.

The active failure domain storage system and the passive failure domain storage system may be remote from one another, or they may both be situated at a common site, local to one another. Local data protection has the advantage of minimizing data lag between target and source, and remote data protection has the advantage is being robust in the event that a disaster occurs at the source side. The primary and secondary storage devices may be connected by a data link 150, such as a wide area network (WAN), an ESCON link, a Fibre Channel link, and/or a Gigabit Ethernet link, although other types of networks are also adaptable for use with the present invention. The RDF functionality may be facilitated with an RDF adapter (RA) provided at each of the storage devices.

When each of the source and target storage systems and is implemented using one or more of the Symmetrix® line of disk arrays available from EMC Corporation of Hopkinton, Mass. a feature called Symmetrix Remote Data Facility (SRDF®) can be employed to implement the connection therebetween. SRDF is described in numerous publications available from EMC Corporation, including the Symmetrix Remote Data Facility Product Manual, P/N 200-999-554, rev. B, June 1995. SRDF is also described in U.S. Pat. No. 5,544,347 (Yanai).

Symmetrix Remote Data Facility (SRDF) facilitates data replication from one Symmetrix storage array to another through a storage area network or Internet Protocol (IP) network. SRDF logically pairs a device or a group of devices from each array and replicates data from one to the other synchronously or asynchronously. In example embodiments of the present invention, the following definitions may be beneficial:

Symmetrix Remote Data Facility facilitates the data replication from one Symmetrix storage array to another through a storage area network or Internet Protocol (IP) network. SRDF logically pairs a device or a group of devices from each array and replicates data from one to the other synchronously or asynchronously Device: A logical unit (LU) of storage in a storage array (e.g., VMAX® by EMC Corporation of Hopkinton, Mass.);

Device Pair: A source device (R1) and a target device (R2) joined together in an SRDF relationship with each of the source device and target device in a respective storage array;

Composite Group: A set of device pairs that form a composite group for SRDF operations, ensuring transactional consistency across the pairs in the group;

Front-end Director Port: SRDF requires connectivity between storage arrays via a port or set of ports on the front-end directors; and RDF Group: A managed container of replicated device groups/pairs along with policy information associated with how that group is to be protected (i.e., synchronous or asynchronous).

RDF may be used to provide backup systems for disaster recovery where one or more backup sites are maintained as mirrors of a primary site using RDF. When the primary site fails, work may be resumed at a backup site. Note, however, that different types of RDF transfers may be used with different tradeoffs for each. Synchronous RDF (SRDF/S) provides the most current version of the data, but often requires close proximity of the sites since data written to a primary site is not acknowledged until the data is written to the backup site. Close proximity (e.g., within same geographic area) may be undesirable for a disaster recovery system since there is a higher probability that a single disaster can cause both sites to fail. On the other hand, asynchronous RDF (SRDF/A) does not require close proximity of the sites, but the copy of the data at the backup site is usually delayed by a significant amount of time (e.g., five minutes), which may be unacceptable or undesirable in some instances.

FIG. 1 is a block diagram of a system 100 according to an example embodiment of the present invention including a composite group 155 of device pairs $130A_1/130B_1$, $130A_2/130B_2$, $130A_3/130B_3$, $130A_3/130B_3$ (source volumes 130A, 130B, generally, respectively) replicated from a first virtual storage array 110A in an active failure domain 115A to a second virtual storage array 110B in a passive failure domain 115B.

In accordance with an embodiment of the present invention, each side (i.e., active failure domain 115A and passive failure domain 115B) of the system 100 includes two major components coupled via a respective Storage Area Network (SAN) 125A, 125B; namely, (i) a storage system, and (ii) a host computer. Specifically with reference to FIG. 1, the active failure domain SAN 125A includes a plurality of active host computers 140A (e.g., host $140A_1$ and host $140A_2$) and a source storage system which may comprise a plurality of storage arrays $120A_1$, $120A_2$, $120A_3$ (120A generally). Similarly, the passive failure domain SAN 125B includes a plurality of standby host computers 140B (e.g., host $140B_1$ and host $140B_2$) and a target storage system which may comprise a plurality of storage arrays $120B_1$, $120B_2$, $120B_3$ (120B generally).

Generally, a SAN includes one or more devices, referred to as "nodes" (not shown). A node in a SAN may be an "initiator" or a "target", or both. An initiator node is a device that is able to initiate requests to one or more other devices; and a target node is a device that is able to reply to requests, such as Small Computer System Interface (SCSI) commands, sent by an initiator node. A SAN may also include network switches (not shown), such as fiber channel switches. The communication links between each host computer and its corresponding storage system may be any appropriate medium suitable for data transfer, such as fiber communication channel links. In an embodiment of the present invention, the host communicates with its corresponding storage system using SCSI commands.

The system 100 includes source storage system 120A and target storage system 120B (120 generally). Each storage system 120 includes physical storage units for storing data, such as disks or arrays of disks. Typically, storage systems 120 are target nodes. In order to enable initiators to send requests to a storage system 120, the storage system 120 exposes one or more logical units (LUs) to which commands are issued. A logical unit is a logical entity provided by a storage system 120 for accessing data stored in the storage system 120. A logical unit is identified by a unique logical unit number (LUN). In an embodiment of the present invention, the active failure domain storage system 120A exposes a plurality of source logical units (not shown) and the passive failure domain storage system 120B exposes a plurality of target logical units (not shown). Thus, the storage systems 120 are SAN entities that provide multiple LUs for access by multiple SAN initiators. In an embodiment of the present invention, the passive failure domain LUs are used for replicating the active failure domain LUs. As such, each passive failure domain LU is generated as a copy of its respective active failure domain LU.

The system 100 includes an active failure domain host computer 140A and a passive failure domain host computer 140B (140 generally). A host computer 140 may be one computer, or a plurality of computers, or a network of distributed computers. Each computer may include inter alia a conventional CPU, volatile and non-volatile memory, a data bus, an I/O interface, a display interface and a network interface. Generally a host computer 140 runs at least one data processing application, such as a database application or an e-mail server.

Generally, an operating system of a host computer 140 creates a host device 130 for each logical unit exposed by a storage system in the host computer SAN 125A, 125B. A host device 130 is a logical entity in a host computer 140, through which a host computer 140 may access a logical unit. In an embodiment of the present invention, as illustrated in FIG. 1, active failure domain host 140A identifies LUs exposed by the active failure domain storage system 120A and generates respective source devices $130A_1$, $130A_2$, $130A_3$, $130A_3$ (130A generally) through which it can access the active failure domain LUs. Similarly, the passive failure domain host 140B identifies LUs exposed by the passive failure domain storage system 120B and generates respective source devices $130B_1$, $130B_2$, $130B_3$, $130B_4$ (130B generally) (130 generally) through which it can access the passive failure domain LUs.

In an embodiment of the present invention, in the course of continuous operation, the host computer 140 is a SAN initiator that issues I/O requests (e.g., write/read operations) through host device 130 to its respective LU using, for example, SCSI commands. Such requests are generally transmitted to the LU with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

As illustrated in FIG. 1, the first virtual storage array 110A may be for Site A (e.g., Boston data center) and the second virtual storage array 110B may be for Site B (e.g., New York data center). The storage management API 105 may be configured to be aware of each of sites A and B and that those sites are configured for protection via RDF. Accordingly, as will be described in greater detail below, example embodiments of the present invention leverage SRDF configurations between Site A and Site B to automatically protect devices 130 to remote data center by automating volume creation, zoning/masking, and initiating/monitoring SRDF connections.

Figure 2:
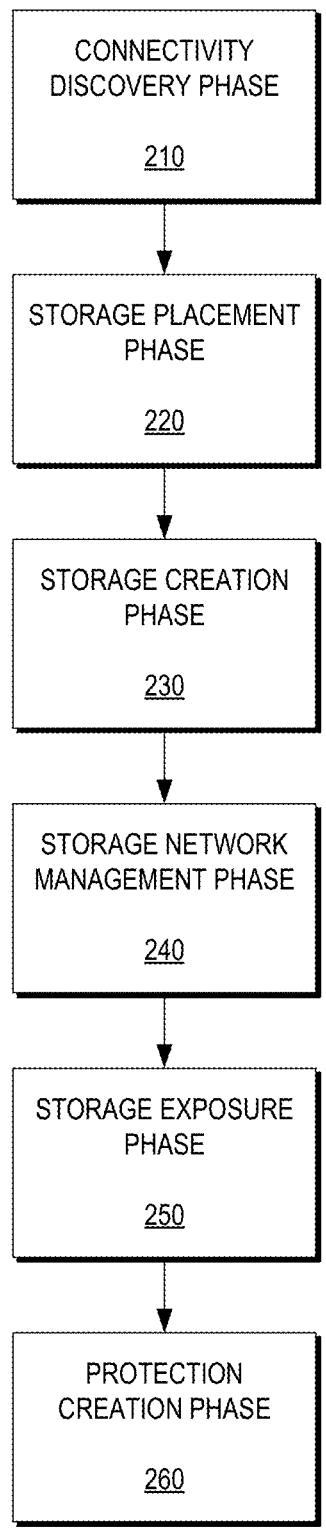
FIG. 2 is a flow diagram of a method according to an example embodiment of the present invention.
Figure 3:
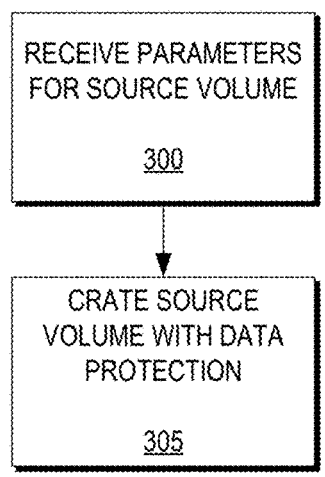
FIG. 3 is a flow diagram of a method for creating a source volume with data protection according to an example embodiment of the present invention.

FIGS. 2 and 3 are flow diagrams of respective methods for creating a volume with data protection according to example embodiments of the present invention. As will be described in greater detail below, the storage management API (e.g., storage management API 105 of FIG. 1) may receive parameters for a source volume (e.g., storage size, storage protocol, source location, and target location) as inputs (300). Example embodiments of the present invention then may create the source volume with data protection according to the received parameters (305).

The storage management API then may perform a series of orchestration steps to create a replicated volume. Connectivity discovery phase (210) discovers the connectivity of storage arrays in a data storage environment. Storage placement phase (220) finds storage arrays and physical storage pools that match the API request and connectivity from source to targets. Storage creation phase (230) creates volumes on the source and target arrays in response to the parameters of the API request. Storage network management phase (240) performs zoning operations. Storage exposure phase (250) masks storage devices to hosts. Protection creation phase (260) creates a protection relationship between volumes by adding the volumes to a replication group. Note however, in certain embodiments, certain orchestration steps may be omitted as specified by API 305. Remote replication (e.g., synchronous or asynchronous) then may be initiated according to a policy.

Figure 4:
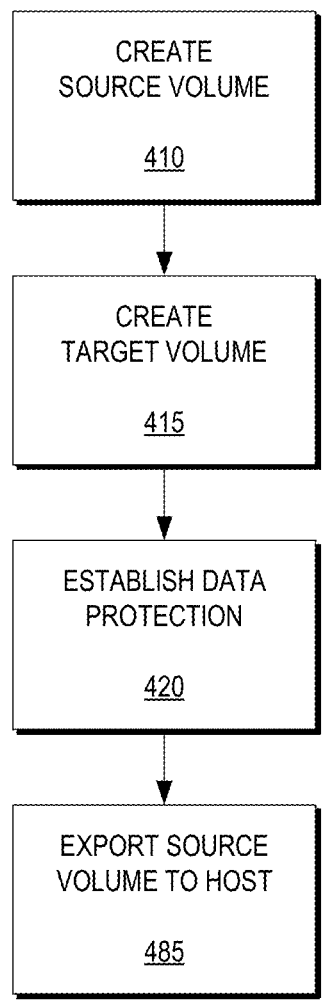
FIG. 4 is a flow diagram of a method for creating a source volume with data protection and exporting it to a host according to an example embodiment of the present invention.

FIG. 4 is a flow diagram of a method for creating a source volume with data protection and exporting it to a host according to an example embodiment of the present invention. As part of the storage creation phase (230) of FIG. 2, example embodiments of the present invention may create the source volume (e.g., source device 130A of FIG. 1) (410) and create the target volume (e.g., target device 130B of FIG. 1) (415). As part of the protection creation phase (260), example embodiments of the present invention may establish a data protection group between the source volume and the target volume according to a data replication mode configured on a data protection policy configured for a replication group (420). As part of the storage exposure phase (250), example embodiments of the present invention may export the source volume to the host (485). FIGS. 5A-5E are flow diagram of methods for establishing data protection according to respective example embodiments of the present invention.

Figure 5:
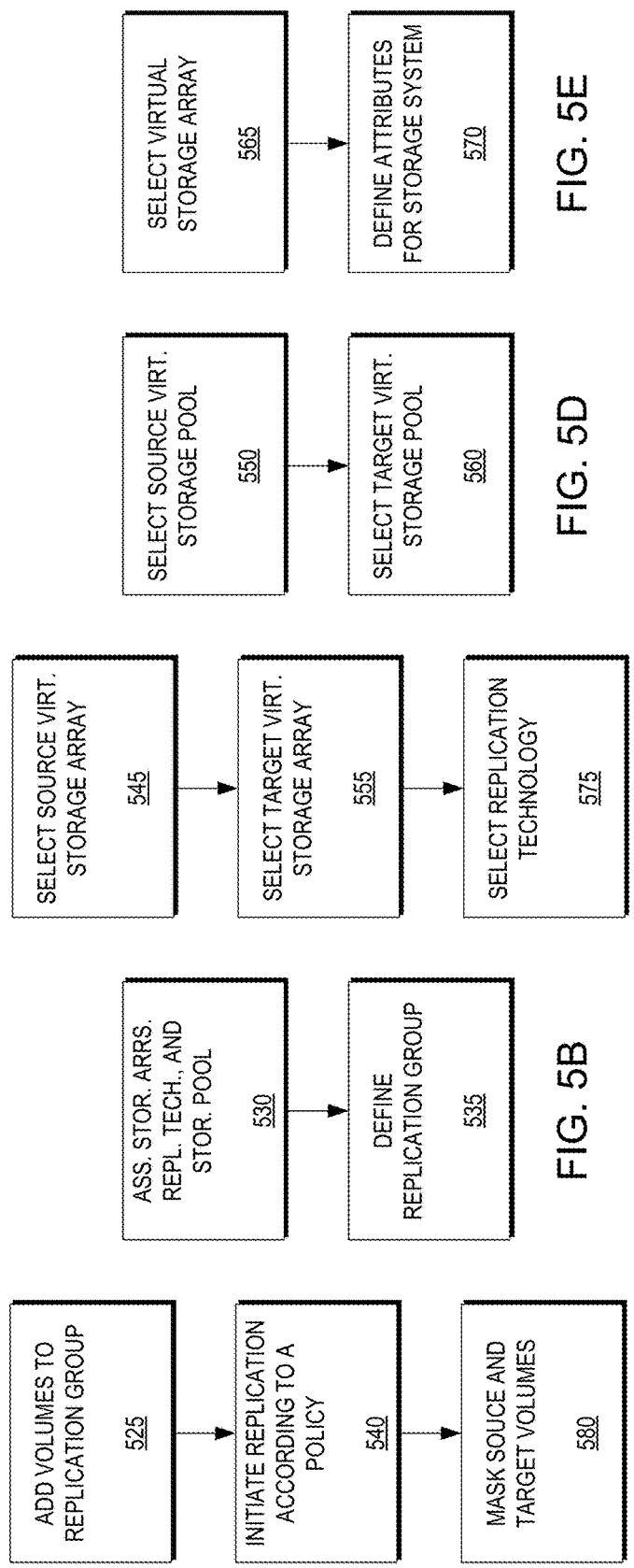
FIGS. 5A-5E are flow diagram of methods for establishing data protection according to respective example embodiments of the present invention.

As illustrated in FIGS. 5A and 5B, to establish a data protection group between the source volume and the target volume during the protection creation phase (260), example embodiments of the present invention may add the source volume and the target volume to a replication group (525) and initiate replication from the source volume to the target volume according to a policy (540). This may comprise associating a source storage array with a target storage array, a replication technology, and a storage pool representing storage that will be used for data replication (530) and defining a replication group (535). As part of the storage exposure phase (250), example embodiments of the present invention then may mask the source volume and the target volume (580).

As illustrated in FIG. 5C, to define a replication group (535), example embodiments of the present invention may select a source virtual storage array (545), select a target virtual storage array (555), and select a replication technology for data protection from the source virtual storage array to the target virtual storage array (575). In certain embodiments, as illustrated in FIG. 5D, this may comprise selecting a source virtual storage pool on the source virtual storage array (550) and selecting a target virtual storage pool on the target virtual storage array (560).

As will be described in greater detail below, and as illustrated in FIG. 5E, virtual storage pools may be defined by selecting a virtual storage array on which the virtual storage pool will be defined (565) and defining attributes for the storage system on which the virtual storage pool will be defined (570).

Figure 6:
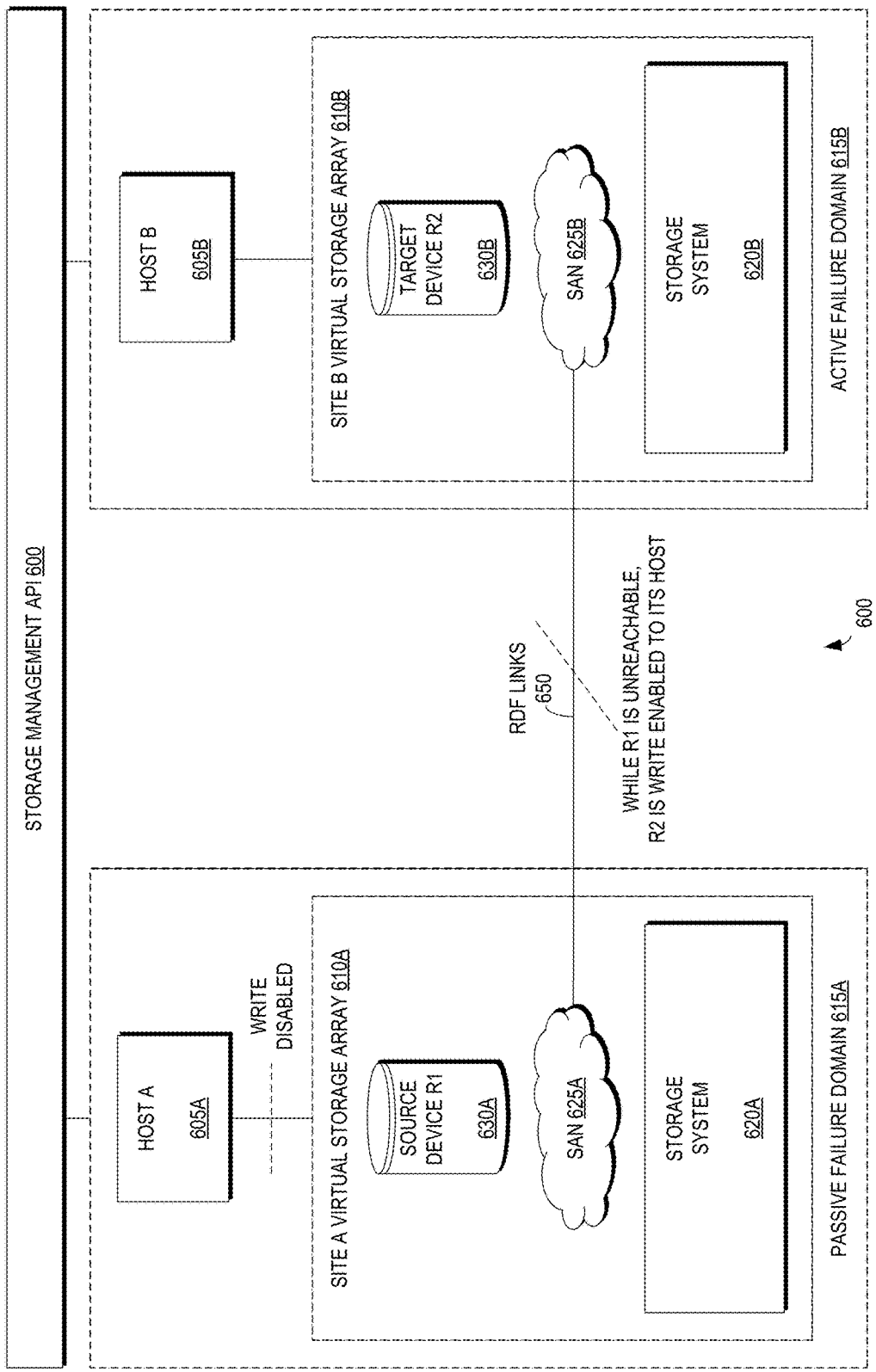
FIG. 6 is a block diagram of the system of FIG. 1 according to an example embodiment of the present invention in a first failover state with the first virtual storage array now in a failover passive failure domain and the second virtual storage array in a failover active failure domain.
Figure 7:
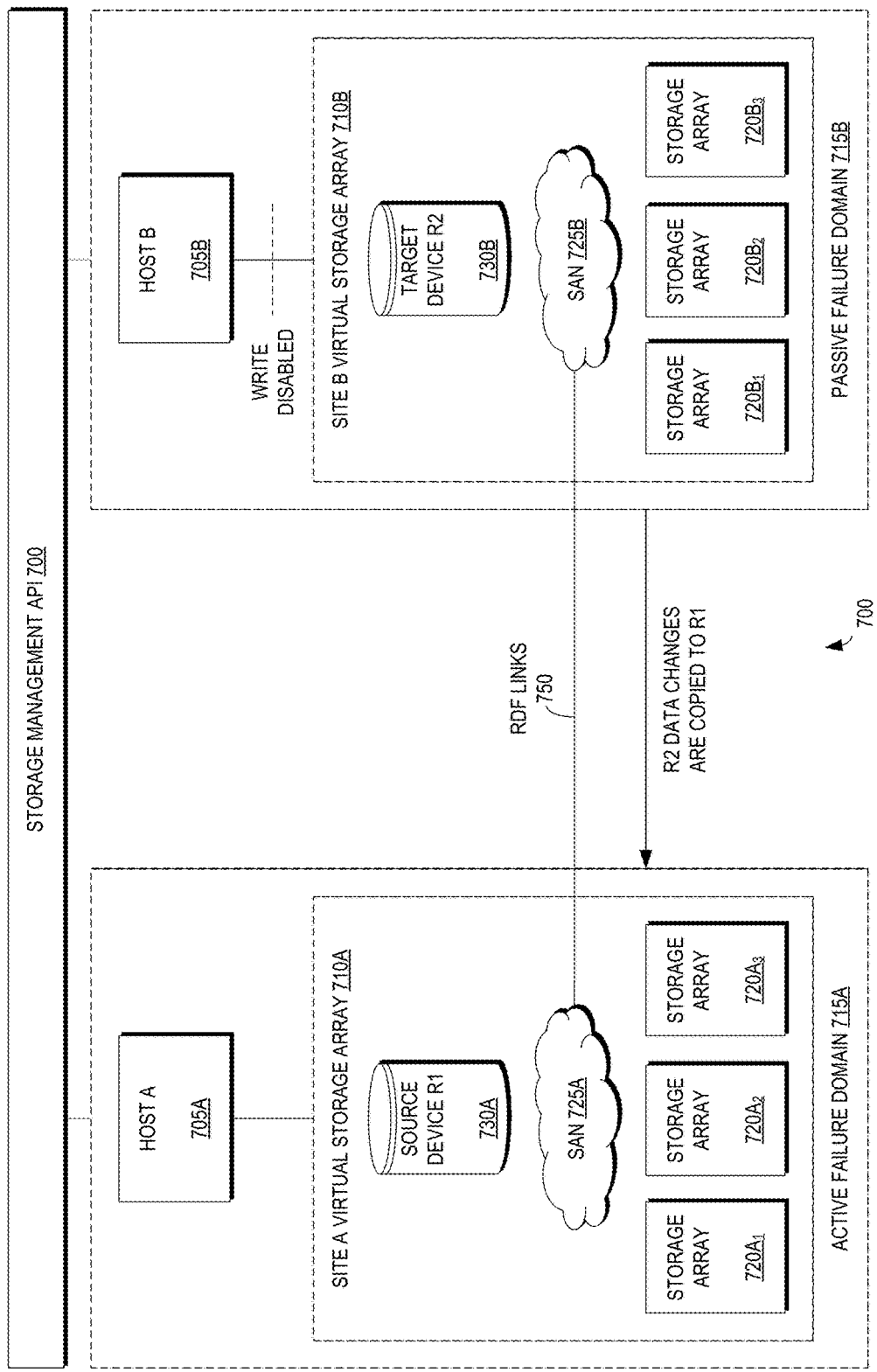
FIG. 7 is a block diagram of the system of FIG. 6 according to an example embodiment of the present invention in a second failover state with the first virtual storage array in the active failure domain and the second virtual storage array in the passive failure domain with changes from the first failover state replicated from the second virtual storage array in the passive failure domain to the first virtual storage array in the active failure domain.
Figure 8A:
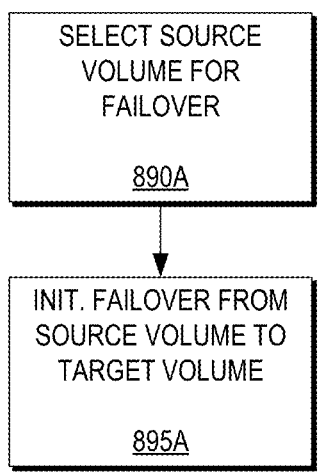
FIGS. 8A and 8B are flow diagrams of method of performing failover between a source volume and a target volume according to respective example embodiments of the present invention.
Figure 8B:
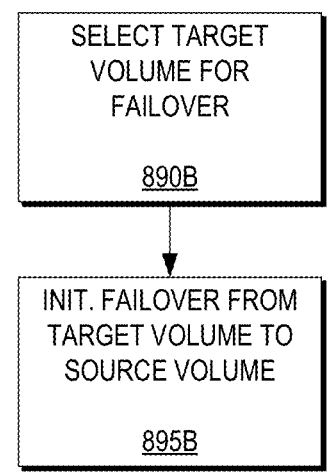

FIGS. 6 and 7 are simplified block diagrams of the system 600, 700 FIG. 1 according to an example embodiment of the present invention in a first and a second failover state, respectively. FIGS. 8A and 8B are flow diagrams of method of performing failover between a source volume and a target volume according to respective example embodiments of the present invention. FIGS. 6, 7, 8A and 8B may be described in conjunction.

During normal operations, the direction of replicated data flow goes from source side (i.e., active failure domain 115A of FIG. 1) to target side (i.e., passive failure domain 115B of FIG. 1). It is possible, however, for a user to enable write access to hosts connected to target volumes in the event of source site failure referred to as a "failover". A failover may be performed in the event of a disaster at the production site (e.g., Site A of FIG. 1), or for other reasons. In some data architectures, Site A or Site B behaves as a production site for a portion of stored data, and behaves simultaneously as a backup site for another portion of stored data. In some data architectures, a portion of stored data is replicated to a backup site, and another portion is not.

As illustrated in FIG. 6, the system 600 is in a first failover state with the first virtual storage array 610A now in a failover passive failure domain 615A and the second virtual storage array 610B in a failover active failure domain 615B. As illustrated in FIG. 6, the failover passive failure domain 615A includes a host A 605A and a Site A virtual storage array 610A including source device R1 630A, SAN 625A, and a storage system 620A. Likewise, the failover active failure domain 615B includes a host B 605B and a Site B virtual storage array 610B including target device R2 630B, SAN 625B, and a storage system 620B. Accordingly, as illustrated in FIG. 6, a user has selected the source device R1 630A for failover (890A) and initiated failover from the source device R1 630A to the target device R2 630B (895A)

As illustrated in FIG. 6, when a failover is performed for each specified RDF pair in a device group (here, simply illustrated as source device R1 and target device R2), if the source device R1 630A is operational, the RDF links 650 are suspended and, if the source side is operational (i.e., the Site A host 605A is able to perform I/O with the Site A virtual storage array 610A, the source device R1 630A is write-disabled to its local host 605A. The target device R2 630B is then read/write enabled to its local hosts 605B to perform I/O.

As illustrated in FIG. 7, the system 700 is in a second failover state with the first virtual storage array 710A in the active failure domain 715A and the second virtual storage array 710B in the passive failure domain 715B with changes from the first failover state (i.e., that occurred during the failover of FIG. 6) replicated from the second virtual storage array 710B in the passive failure domain 715B to the first virtual storage array 710A in the active failure domain 715A. As illustrated in FIG. 7, the active failure domain 715A includes a host A 705A and a Site A virtual storage array 710A including source device R1 730A, SAN 725A, and a storage system 720A. Likewise, the passive failure domain 715B includes a host B 705B and a Site B virtual storage array 710B including target device R2 730B, SAN 725B, and a storage system 720B. Accordingly, as illustrated in FIG. 7, a user has selected the target device R2 730B for failover (890B) and initiated failover from the target device R2 730B to the source device R1 730A (895B)

Invoking a failover again on an already failed over volume will trigger failback. As illustrated in FIG. 7, when a failback is initiated for each specified RDF pair in a device group, the target device R2 730B is write-disabled to its local host 705B and traffic is suspended on the SRDF links 750. If the target side (i.e., Site B) is operational, and there are invalid remote R2 730B tracks on the source side (i.e., Site A) (and the force option is specified), the invalid R1 730A source tracks are marked to refresh form the target side R2 730B. The invalid tracks on the source R1 730A side are refreshed from the target R2 730B side over the RDF links 750. The track tables are mirrored between R1 and R2 sides. Traffic is then resumed on the RDF links 750.

FIGS. 9-20 are screen shots of a graphical user interface for creating a source volume with data protection that may be used by an IT administrator according to an example embodiment of the present invention.

Figure 9:
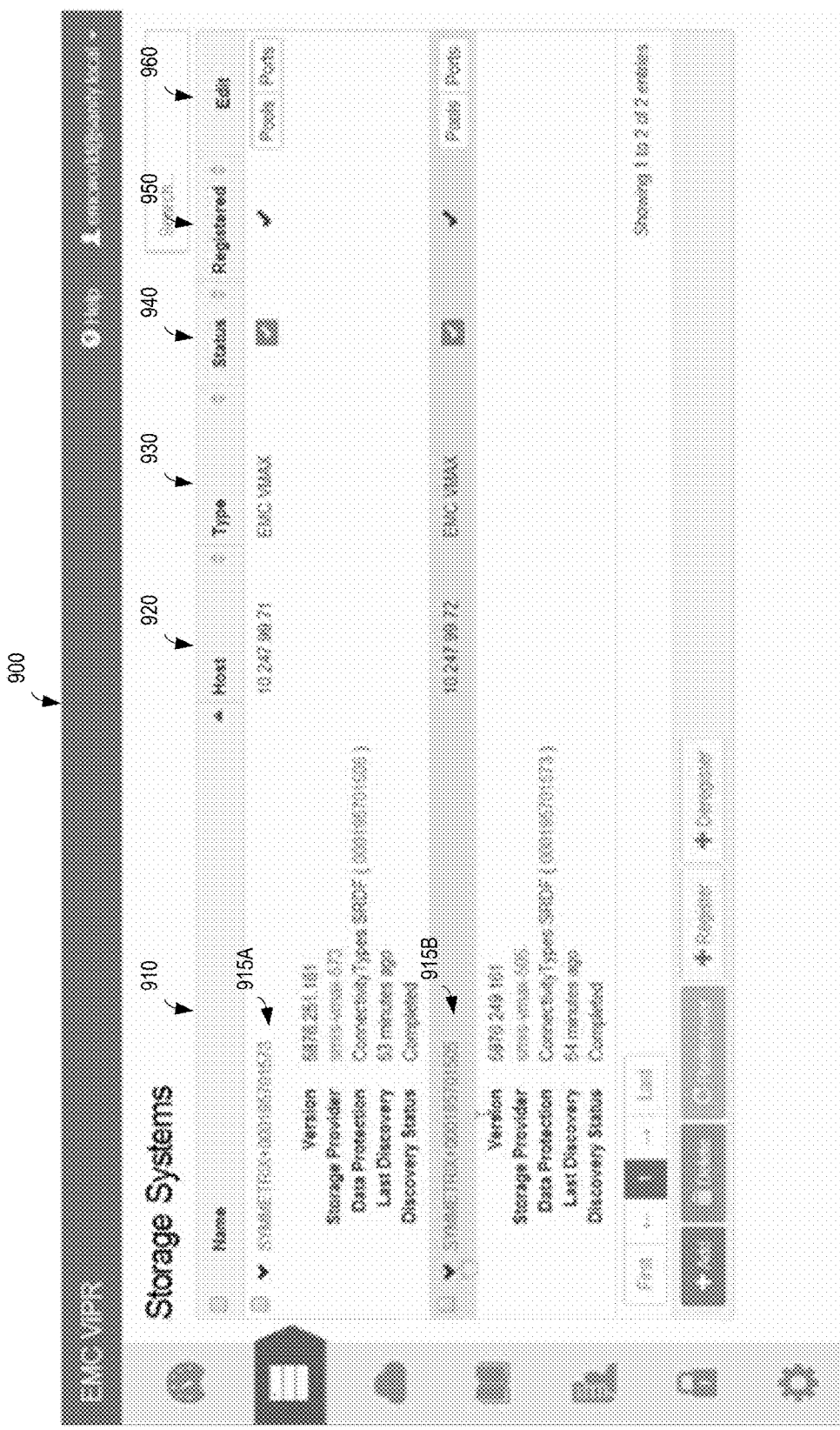
FIG. 9 is a screen shot of a graphical user interface illustrating a plurality of storage systems according to an example embodiment of the present invention.

FIG. 9 is a screen shot of a graphical user interface (GUI) 900 illustrating a plurality of storage systems according to an example embodiment of the present invention. As illustrated in FIG. 9, there are two storage systems available: SYMMETRIX+000195701573 915A (e.g., storage system 120A of FIG. 1 in the active failure domain 115A) and SYMMETRIX+000195701505 915B (e.g., storage system 120B of FIG. 1 in the passive failure domain 115B) (915 generally). As illustrated in FIG. 9, each storage system 915 may have a plurality of attributes, including its version, the identity of the storage provider managing the storage system, types of data protection available for the storage system (e.g., SRDF), the time the storage system was last discovered by the storage management API, and the status of that discovery. Further, as illustrated in FIG. 9, the GUI 900 may provide information regarding the storage systems 915, such as storage system name 910, the host 920 by which storage from the storage system is accessible, the storage system type 930 (e.g., VMAX), the storage system status 940 (e.g., available, failure), whether the storage system is registered 950 with the storage management API, and the ability to edit 960 the pools and ports comprising the storage system.

Figure 10:
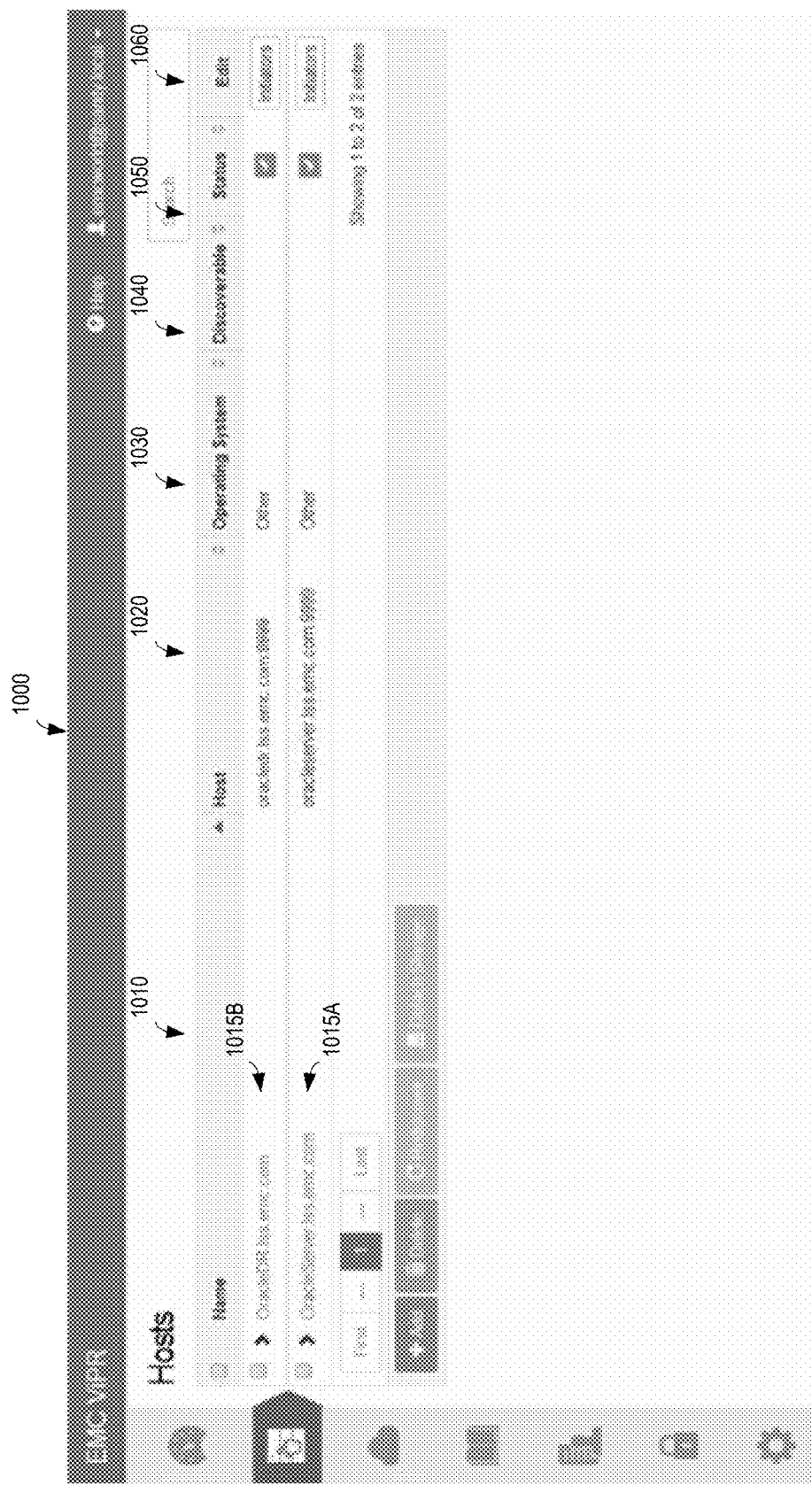
FIG. 10 is a screen shot of a graphical user interface illustrating a plurality of hosts according to an example embodiment of the present invention.

FIG. 10 is a screen shot of a graphical user interface (GUI) 1000 illustrating a plurality of hosts according to an example embodiment of the present invention. As illustrated in FIG. 10, there are two hosts available: OracleServer.lss.emc.com 1015A (e.g., active host 140A of FIG. 1 in the active failure domain 115A) and OracleDR.lss.emc.com 1015B (e.g., passive host 140B of FIG. 1 in the passive failure domain 115B) (1015 generally). As illustrated in FIG. 10, the GUI 1000 may provide information regarding the hosts 1015, such as host name 1010, the host worldwide name (WWN) 1020, the host operating system 1030, whether the host is discoverable 1040, the host status 1050 (e.g., available, failure), and the ability to edit 1060 initiators (i.e., ports) of the host.

Figure 11:
FIG. 11 is a screen shot of a graphical user interface for creating a virtual storage array according to an example embodiment of the present invention.

FIG. 11 is a screen shot of a graphical user interface (GUI) 1100 for creating a virtual storage array according to an example embodiment of the present invention. As illustrated in FIG. 11, an IT administrator may provide a name 1110 for the virtual array and, as will be described in greater detail below, assign a plurality of physical storage pools for later aggregation and use for creating virtual storage pools. As will be described below with reference to FIGS. 12 and 13A-13C, the IT administrator may add physical storage pools to the virtual storage array by adding networks 1150, adding storage ports 1160, adding storage pools 1170, and by adding storage systems 1180.

Figure 12:
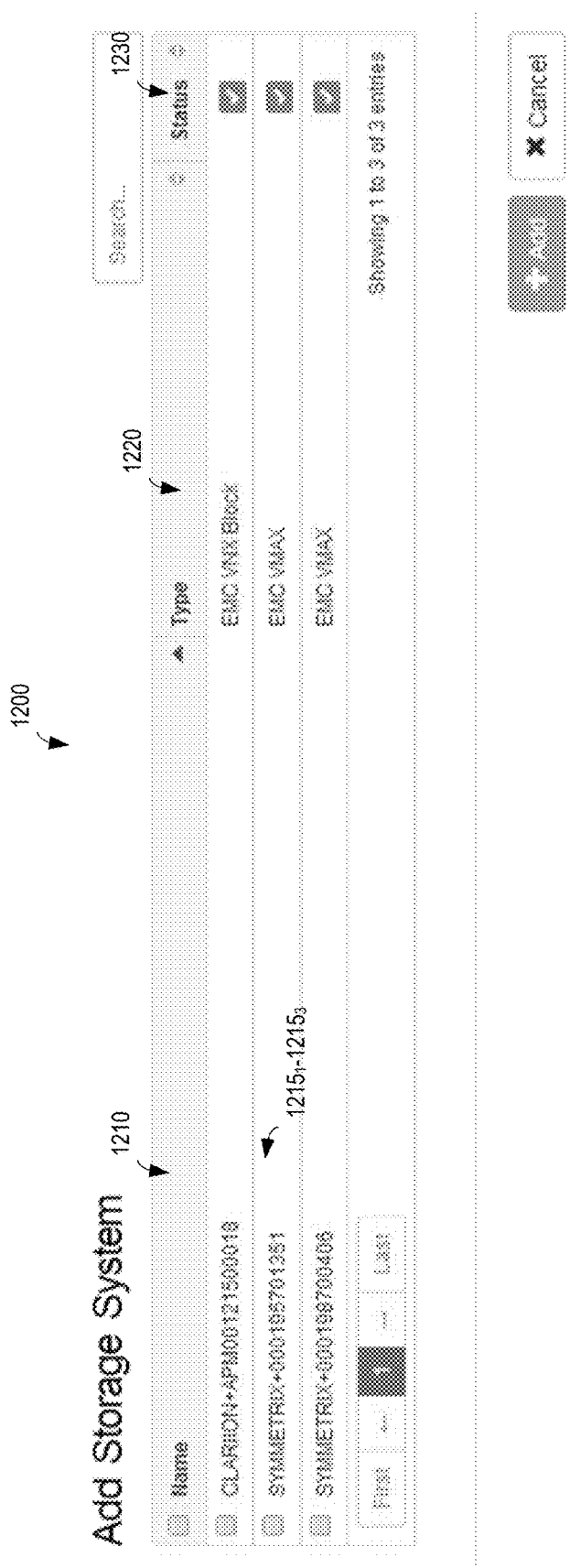
FIG. 12 is a screen shot of a graphical user interface for adding a storage system to a virtual storage array according to an example embodiment of the present invention.

FIG. 12 is a screen shot of a graphical user interface (GUI) 1200 for adding a storage system to a virtual storage array according to an example embodiment of the present invention. As illustrated in FIG. 12, the GUI 1200 displays a plurality of storage systems $1215_1$-$1215_3$ (1215 generally) that may be managed via the storage management API. The GUI 1200 displays information regarding the available storage systems 1215, such as name 1210, storage system type 1220 (e.g., VNX®, VMAX), and storage system status 1230. An IT administrator may select one or more of the available storage systems 1215 and add them to the virtual storage array.

Figure 13A:
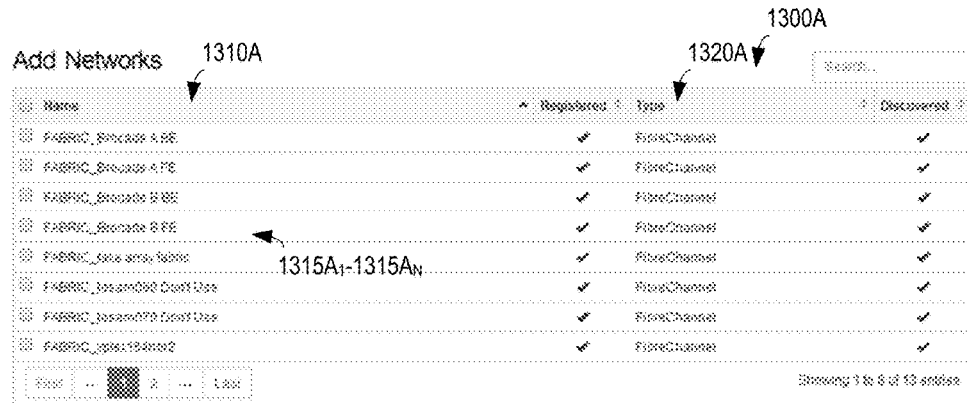
FIGS. 13A-13C are screen shots of respective graphical user interfaces for adding networks, storage ports, and storage pools according to example embodiments of the present invention.
Figure 13B:
Figure 13C:
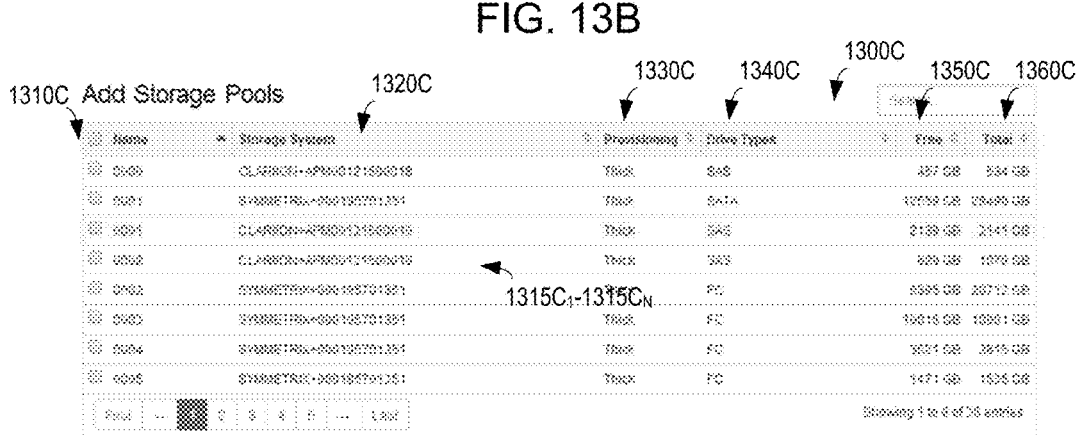

FIGS. 13A-13C are screen shots of respective graphical user interfaces (GUIs) 1300A, 1300B, 1300C for adding networks, storage ports, and storage pools according to example embodiments of the present invention.

As illustrated in FIG. 13A, the GUI 1300A displays a plurality of networks $1315A_1$-$1315A_N$ (1315A generally) that may be managed via the storage management API. The GUI 1300A displays information regarding the available networks 1315A, such as name 1310A and type 1320A. An IT administrator may select one or more of the available networks 1315A and add them to the virtual storage array.

As illustrated in FIG. 13B, the GUI 1300B displays a plurality of storage ports $1315B_1$-$1315B_N$ (1315B generally) that may be managed via the storage management API. The GUI 1300B displays information regarding the available networks 1315B, such as name 1310B, storage system 1320B, type 1340B, and port status 1350B. An IT administrator may select one or more of the available storage ports 1315B and add them to the virtual storage array.

As illustrated in FIG. 13C, the GUI 1300C displays a plurality of storage pools $1315C_1$-$1315C_N$ (1315C generally) that may be managed via the storage management API. The GUI 1300C displays information regarding the available storage pools 1315C, such as name 1310C, storage system 1320C, provisioning type 1330C, drive type 1340C, free space 1350C, and total space 1360C.

It should be understood that a virtual storage array aggregates the management of storage capacity (i.e., pools) and connectivity (i.e., ports). Storage pools and storage ports may be assigned directly to the virtual array (as in FIGS. 13B and 13C) or implicitly via network connectivity (as in FIG. 13A).

Figure 14:
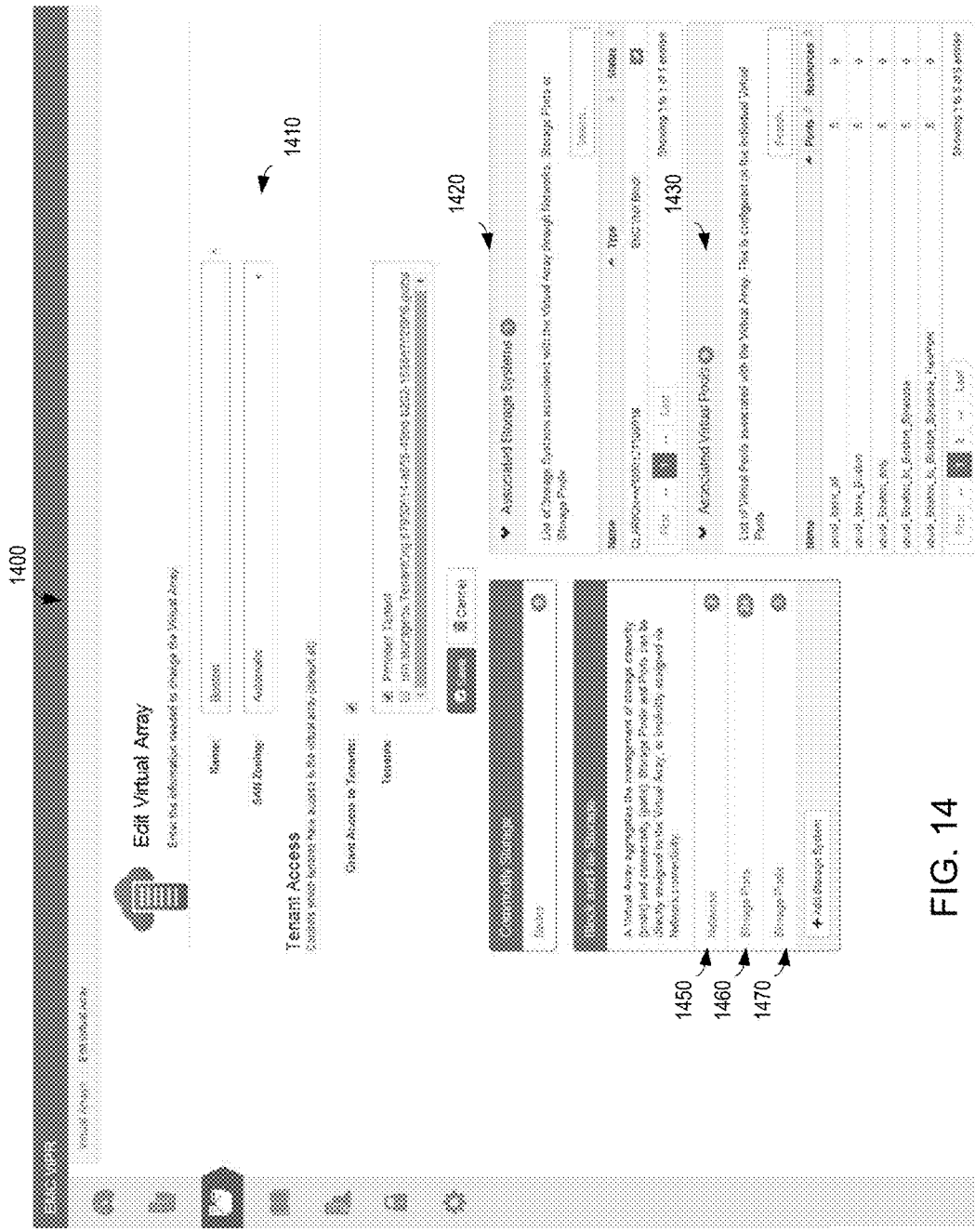
FIG. 14 is a screen shot of a graphical user interface illustrating a virtual storage array including a plurality of networks, a plurality of storage ports, and a plurality of storage pools according to an example embodiment of the present invention.

FIG. 14 is a screen shot of a graphical user interface (GUI) 1400 illustrating a virtual storage array including a plurality of networks 1450, a plurality of storage ports 1460, and a plurality of storage pools 1470 according to an example embodiment of the present invention. As illustrated in FIG. 14, there is one storage system 1420 associated with the virtual storage array and, after creating virtual storage pools, nine virtual storage pools 1430 associated with the virtual storage array. Further, there are two networks 1450, twenty-four storage ports 1460, and nine storage pools 1470 associated with the virtual storage array. These storage capacity (i.e., pools) and connectivity (i.e., ports) resource may be used by an IT administrator in creative virtual storage pools, as described below.

Figure 15:
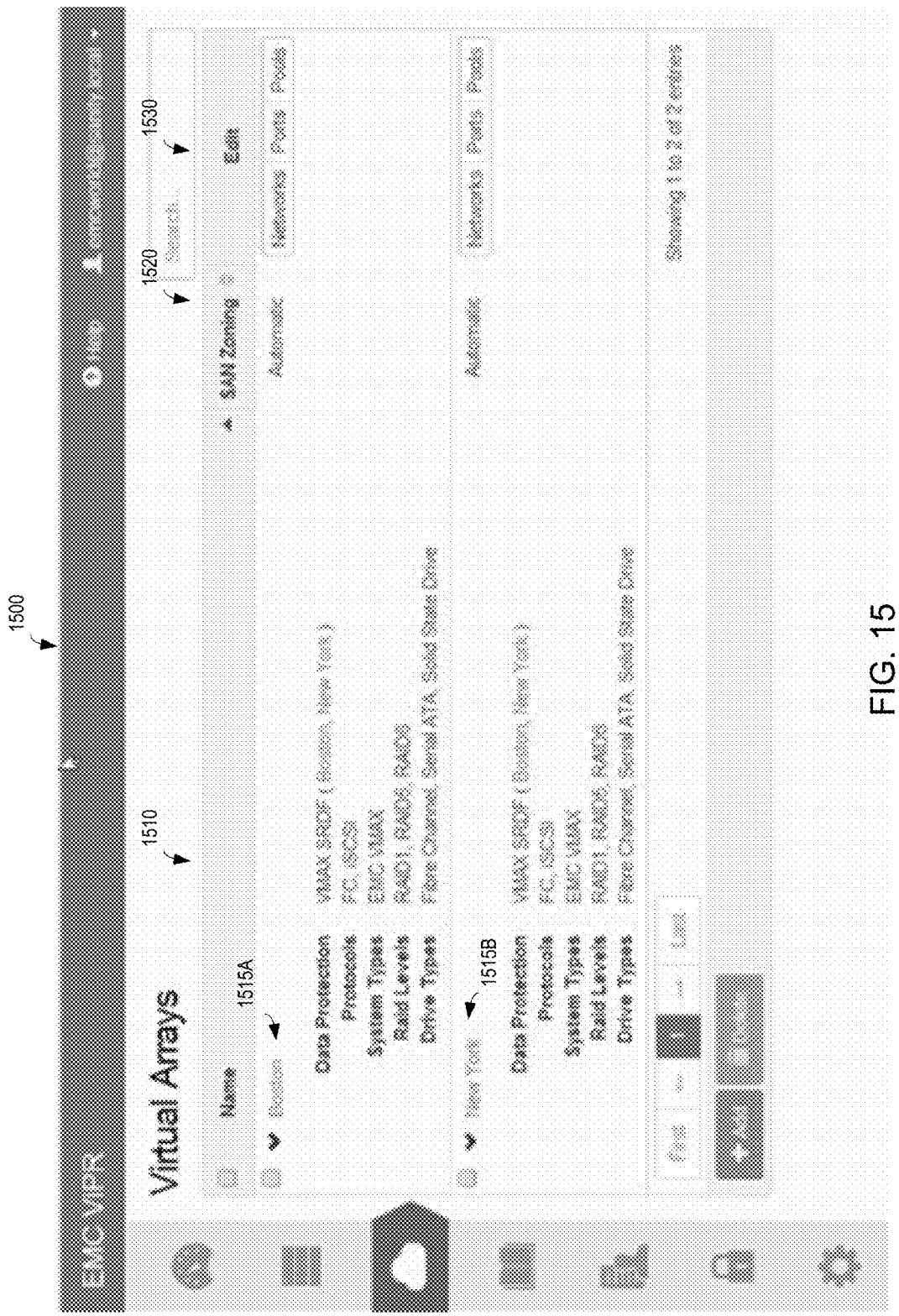
FIG. 15 is a screen shot of a graphical user interface illustrating a plurality of virtual storage arrays according to an example embodiment of the present invention.

FIG. 15 is a screen shot of a graphical user interface (GUI) 1500 illustrating a plurality of virtual storage arrays according to an example embodiment of the present invention. As illustrated in FIG. 15, there are two virtual arrays available: Boston 1515A (e.g., Site A virtual storage array 110A of FIG. 1 in the active failure domain 115A) and New York 1515B (e.g., Site B virtual storage array 110B of FIG. 1 in the passive failure domain 115B) (1515 generally). As illustrated in FIG. 15, each virtual storage array 1515 may have a plurality of attributes, including its data protection available for the virtual storage array and between which virtual storage arrays (e.g., SRDF between Boston and New York), protocols (e.g., fibre channel, iSCSI) supported by the virtual storage array, storage system types comprising the virtual storage array (e.g., VMAX), RAID levels supported by the virtual storage array (e.g., RAID1, RAID5, RAID6), and drive types available on the virtual storage array (i.e., available on the storage systems comprising the virtual storage array) (e.g., fibre channel (FC), serial ATA (SATA), solid state drive (SSD)). Further, as illustrated in FIG. 15, the GUI 1500 may provide information regarding the virtual storage arrays 1515, such as virtual storage array name 1510 (e.g., Boston, New York), SAN zoning support by the virtual storage array 1520, and the ability to edit 1530 the networks, ports, and pools comprising the virtual storage array. It should be understood that the source and target virtual storage arrays (i.e., Site A virtual storage array 110A and Site B virtual storage array 110B of FIG. 1) would be created such that the source storage system (e.g., active failure domain storage array 120A) (i.e., SYMMETRIX+ 000195701573 915A of FIG. 9) is placed in the source virtual storage array (i.e., Boston 1515A) and the target storage system (e.g., passive failure domain storage array 120B) (i.e., and SYMMETRIX+000195701505 915B of FIG. 9) is placed in the target virtual storage array (i.e., New York 1515B).

Figure 16:
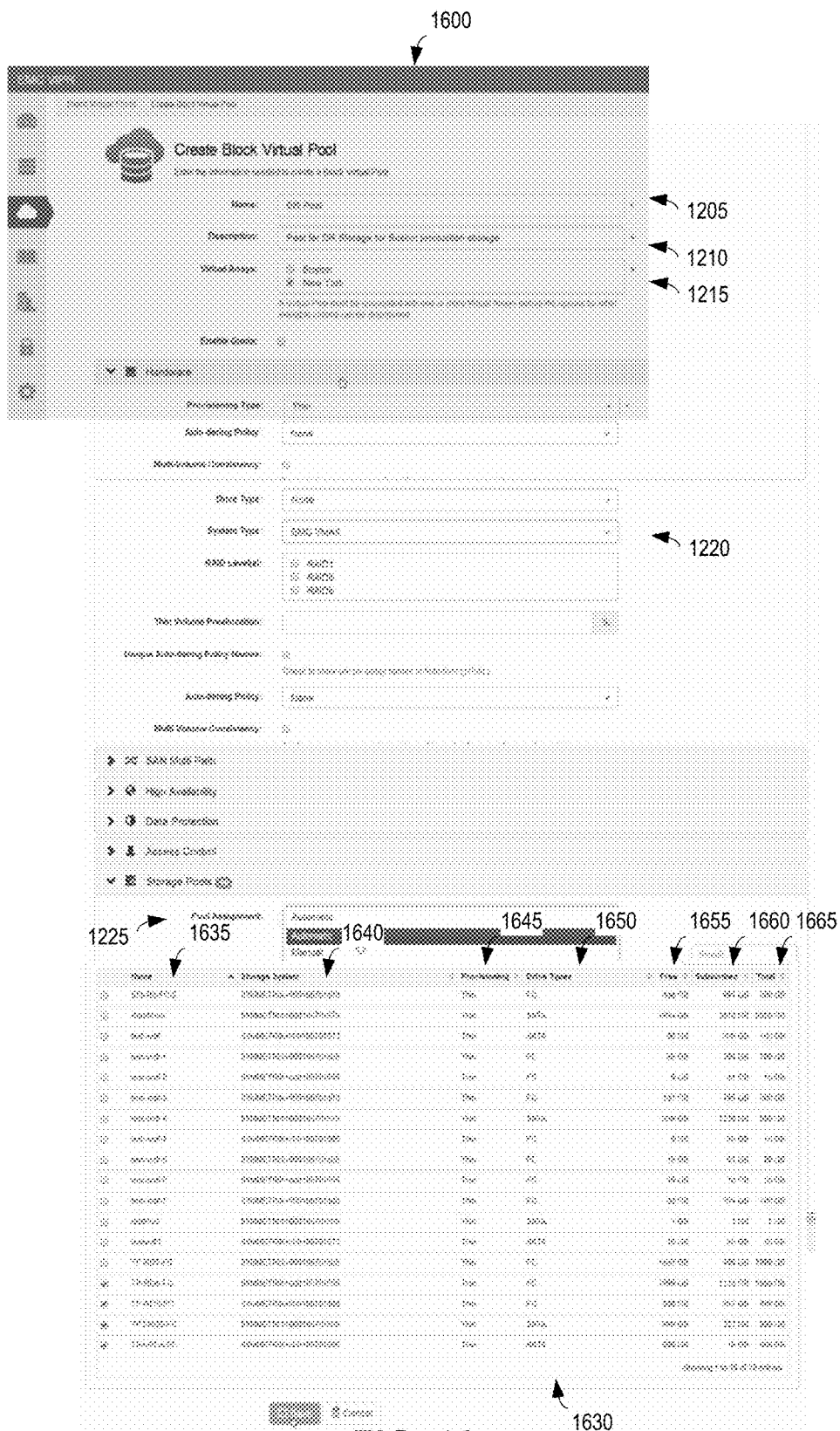
FIG. 16 is a screen shot of a graphical user interface for creating a virtual storage pool for data replication according to an example embodiment of the present invention.

FIG. 16 is a screen shot of a graphical user interface (GUI) 1600 for creating a virtual storage pool for data replication according to an example embodiment of the present invention. In other words, the GUI 1600 of FIG. 16 illustrates inputs for creating a data replication virtual storage pool representing storage that will be used for data replication storage for SRDF. The virtual storage pool may be given a name 1605 (e.g., "DR pool") and a description 1610 (e.g., "Pool for DR Storage for Boston production storage), and a virtual storage array 1615 (e.g., New York) may be selected to determine from which virtual storage array the resources for the virtual storage pool should come. Further, the storage system type 1620 may be defined, further limiting the type of storage system in the selected virtual storage array that may be used for storage selected for the virtual storage pool.

The storage management API then may determine which physical storage pool(s) in the selected virtual storage array (s) satisfy the provided attributes. In a preferred embodiment, certain attributes are required for creation of a virtual storage pool: protocol, a selection of virtual arrays, volume provisioning type (e.g., thin, thick), and multipathing (e.g., enabled, disabled). It should be understood that, while these are required attributes in the preferred embodiment, this does not mean that, for example, multipathing need be enabled; rather, only an indication regarding the attribute (e.g., multipathing is either enabled or disabled) is required. Other attributes may function as filters to further refine the resulting physical storage pools that satisfy the attributes: storage system type (e.g., VMAX), RAID level (e.g., RAID0, RAID1, RAID5, RAID6), storage drive type (e.g., fibre channel (FC), serial ATA (SATA), solid state drive (SSD), and storage tiering policy.

As illustrated in FIG. 16, after applying the mandatory attributes and filter attributes to the physical storage pool filtering process described above, a plurality of physical storage pools 1630 are returned. In certain embodiments, pool assignment 1625 from the plurality of physical storage pools 1630 may be done automatically or, as illustrated in FIG. 16, one or more physical storage pools 1630 may be selected for inclusion in the virtual storage pool. It should be understood that each of the returned physical storage pools 1630 satisfies the criteria established by the attributes provided by the IT administrator creating the virtual storage pool. The GUI 1600 provides information regarding each physical storage pool 1630 including its name 1635, the storage system 1640 on which it resides, the provisioning type 1645, the drive types 1650 used in the physical storage pool, the amount of free space 1655 in the physical storage pool, the amount of storage subscribed to in the physical storage pool 1660, and the total space in the physical storage pool 1665.

Figure 17:
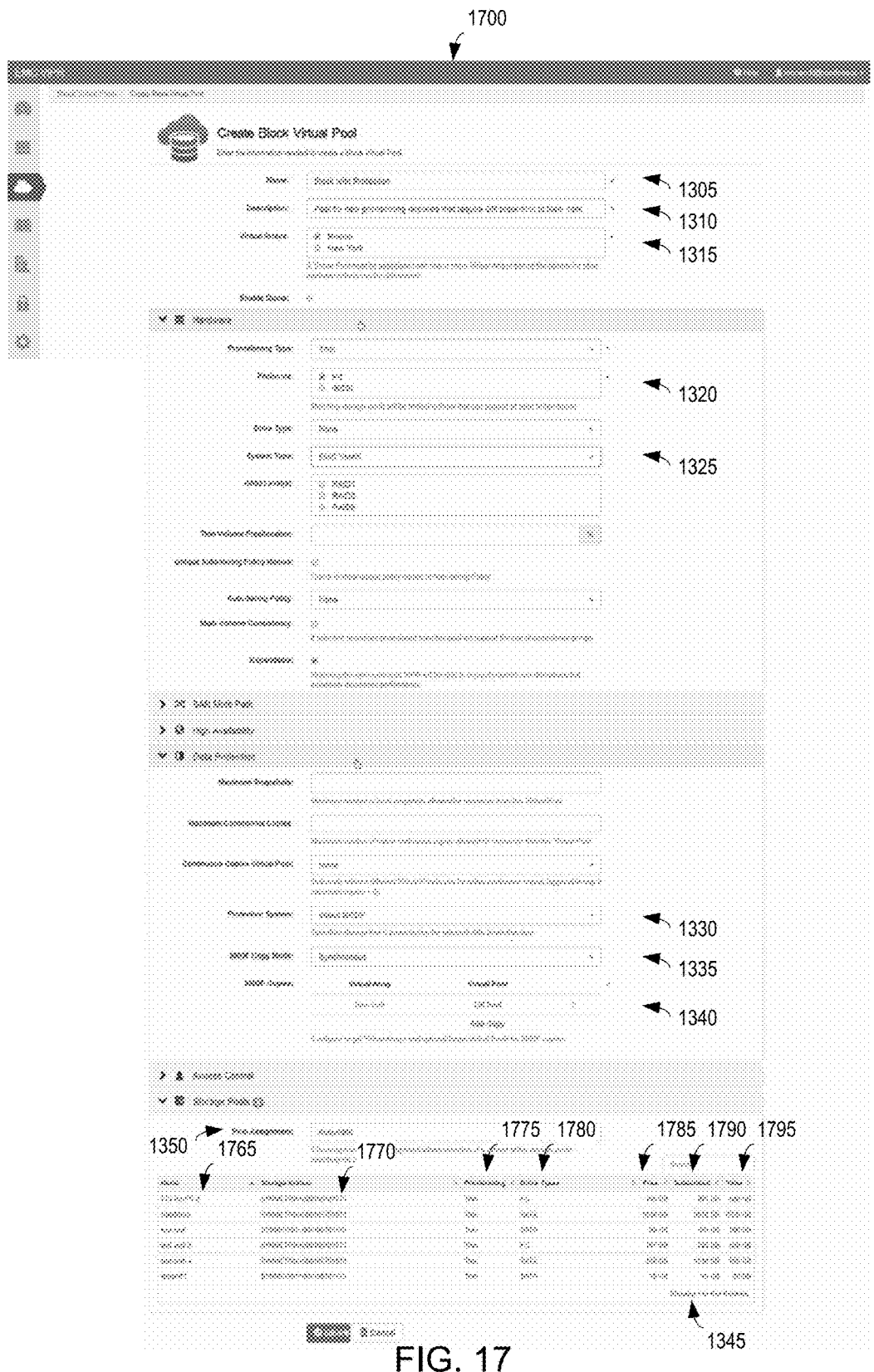
FIG. 17 is a screen shot of a graphical user interface for creating a virtual storage pool for provisioning requests that require data replication according to an example embodiment of the present invention.

FIG. 17 is a screen shot of a graphical user interface (GUI) 1700 for creating a virtual storage pool for provisioning requests that require data replication according to an example embodiment of the present invention. In other words, the GUI 1700 of FIG. 17 illustrates inputs for creating a source virtual storage pool representing storage that will be used for storage provisioning and, as described in greater detail below, with data protection. The virtual storage pool may be given a name 1705 (e.g., "Block with Protection") and a description 1710 (e.g., "Pool for new provisioning requests that require DR protection to New York"), and a virtual storage array 1715 (e.g., Boston) may be selected to determine from which virtual storage array the resources for the virtual storage pool should come. Further, the supported storage protocols 1720 and storage system type 1725 may be defined, further limiting the type of storage system in the selected virtual storage array that may be used for storage for the virtual storage pool.

The IT administrator also may define a type of data protection to be used with storage provisioned out of the virtual storage pool by selecting a type of protection system 1730 (e.g., SRDF), a copy mode 1735 (e.g., synchronous), and a target virtual storage array (e.g., New York) and target virtual storage pool (e.g., DR Pool created in FIG. 16) 1740.

The storage management API then may determine which physical storage pool(s) in the selected virtual storage array (s) satisfy the provided attributes. In a preferred embodiment, certain attributes are required for creation of a virtual storage pool: protocol, a selection of virtual arrays, volume provisioning type (e.g., thin, thick), and multipathing (e.g., enabled, disabled). It should be understood that, while these are required attributes in the preferred embodiment, this does not mean that, for example, multipathing need be enabled; rather, only an indication regarding the attribute (e.g., multipathing is either enabled or disabled) is required. Other attributes may function as filters to further refine the resulting physical storage pools that satisfy the attributes: storage system type (e.g., VMAX), RAID level (e.g., RAID0, RAID1, RAID5, RAID6), storage drive type (e.g., fibre channel (FC), serial ATA (SATA), solid state drive (SSD), and storage tiering policy.

As illustrated in FIG. 17, after applying the mandatory attributes and filter attributes to the physical storage pool filtering process described above, a plurality of physical storage pools 1745 are returned. In certain embodiments, pool assignment 1750 from the plurality of physical storage pools 1745 may be done automatically as illustrated in FIG. 17 or one or more physical storage pools 1745 may be selected for inclusion in the virtual storage pool. It should be understood that each of the returned physical storage pools 1745 satisfies the criteria established by the attributes provided by the IT administrator creating the virtual storage pool. The GUI 1700 provides information regarding each physical storage pool 1745 including its name 1765, the storage system 1770 on which it resides, the provisioning type 1775, the drive types 1780 used in the physical storage pool, the amount of free space 1785 in the physical storage pool, the amount of storage subscribed to in the physical storage pool 1790, and the total space in the physical storage pool 1795.

Figure 18:
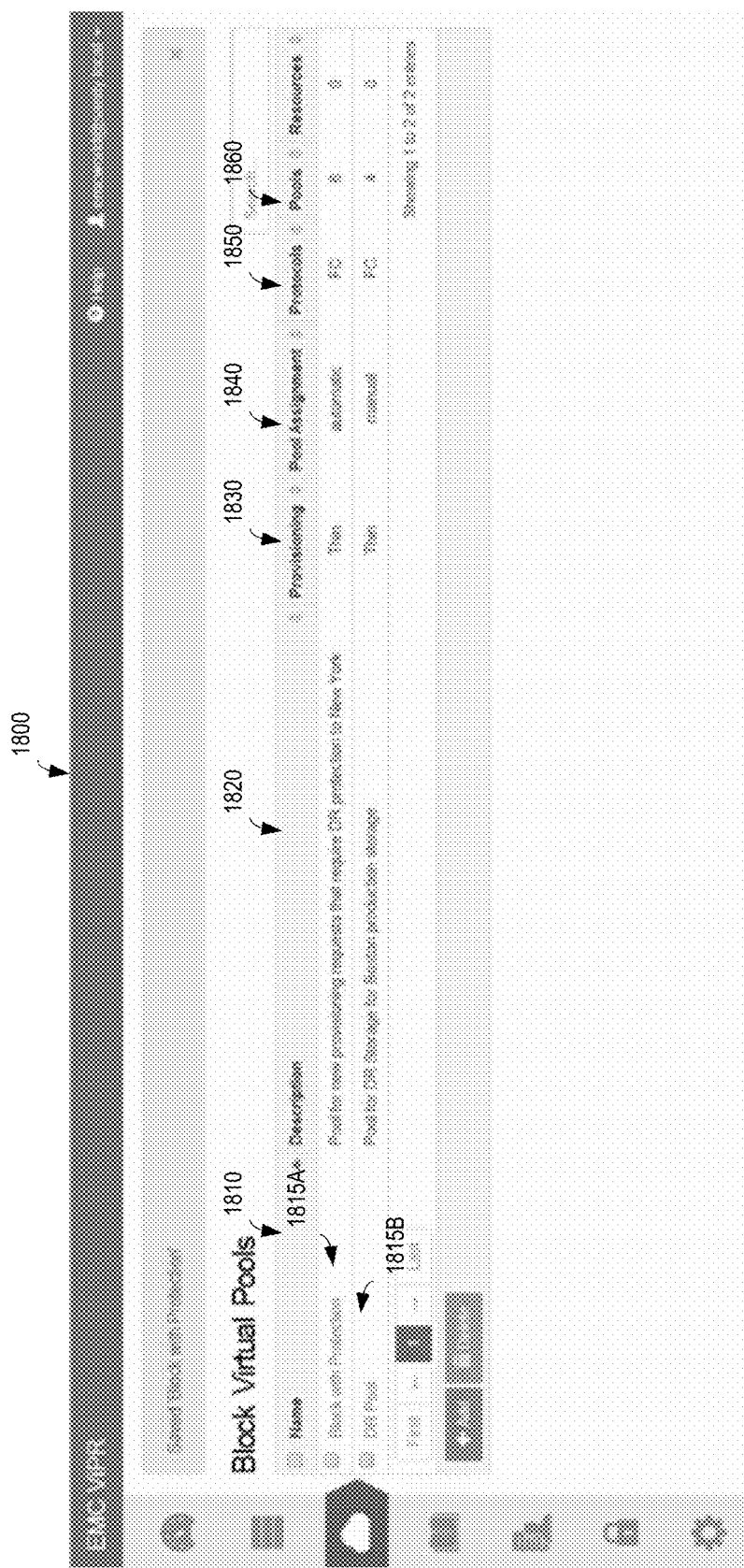
FIG. 18 is a screen shot of a graphical user interface illustrating the virtual storage pools created in FIGS. 16 and 17 according to an example embodiment of the present invention.

FIG. 18 is a screen shot of a graphical user interface (GUI) 1800 illustrating the virtual storage pools created in FIGS. 16 and 17 (e.g., "Block with Protection" 1815A for creating volumes requiring data protection in the active failure domain 115A and "DR Pool" 1815B for data protection in the passive failure domain 115B) (1815 generally) according to an example embodiment of the present invention. As illustrated in FIG. 18, the GUI 1800 displays information regarding the virtual storage pools 1815 provided when creating the virtual storage pool (i.e., in FIGS. 16 and 17)

including virtual storage pool name 1810 provided, virtual storage pool description 1820, the provisioning type 1830, the pool assignment (e.g., automatic, manual) 1840, the supported protocols 1850, and the number of physical storage pools in the virtual storage pool 1860.

Figure 19:
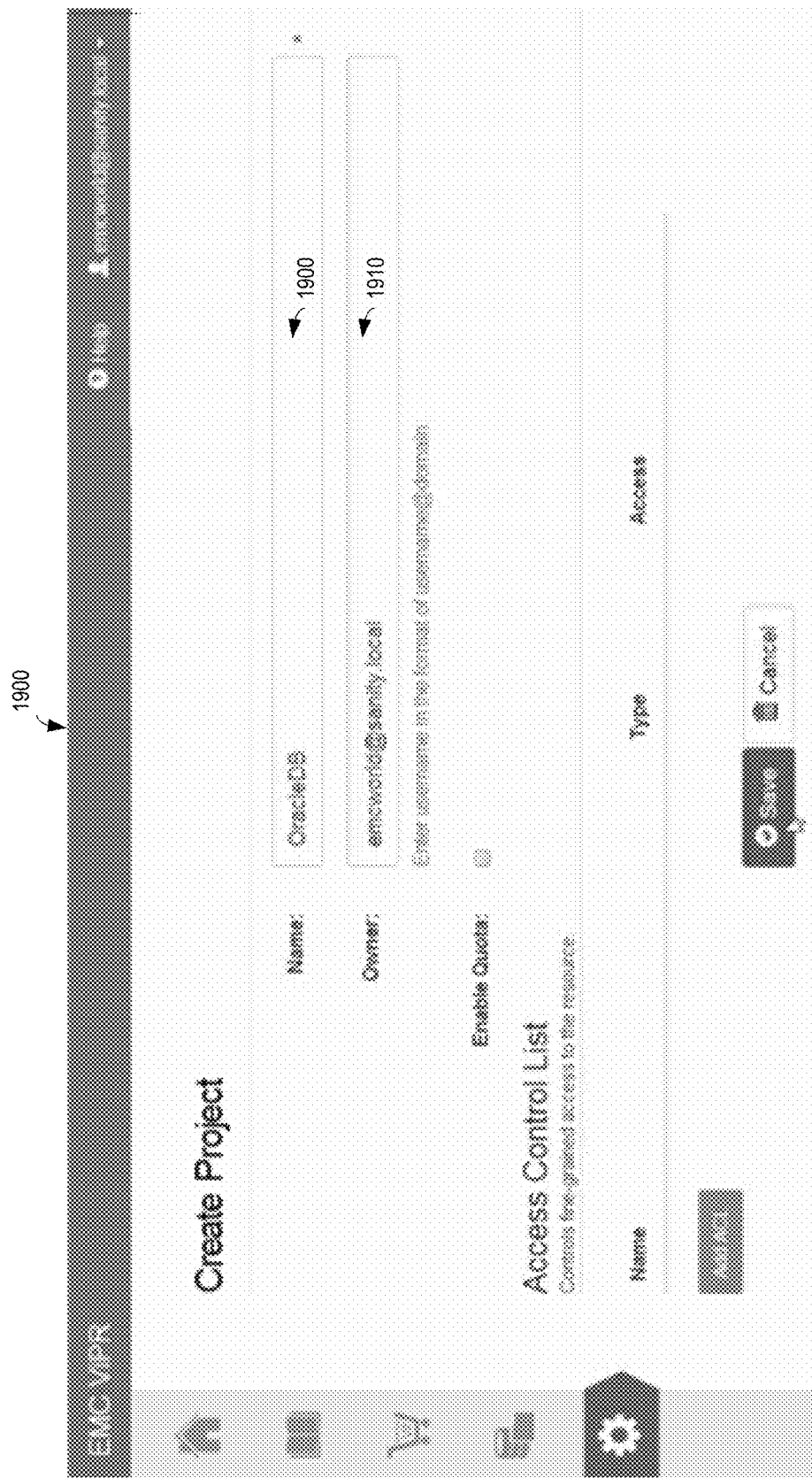
FIG. 19 is a screen shot of a graphical user interface for creating a project according to an example embodiment of the present invention.

FIG. 19 is a screen shot of a graphical user interface (GUI) 1900 for creating a project according to an example embodiment of the present invention. As illustrated in FIG. 19, a project having a project name 1900 and a project owner 1910 may be created. In a preferred embodiment, it is a best practice to map the project name 1900 to the name of the RDF group. A project is a resource organization abstraction that logically groups resources provisioned from different data services. Users can create their own projects, and they can associate multiple resources from different services with them. Resources from one project can be shared between multiple users under the same tenant. Users can associate resources provisioned from one or multiple services with a project. Projects allow users to create logical groupings of different types of resources. Different users can access resources that are associated with the same project. It should be understood that, in a preferred embodiment, access to resources is managed by the access control list (ACL) for the resources and not by the projects. Further, in certain embodiments, resource usage may be metered and may be reported per project, so users and tenant admins can get usage information itemized by project.

Figure 20:
FIG. 20 is a screen shot of a graphical user interface for creating a volume for a host from the virtual storage pool created in FIG. 17 according to an example embodiment of the present invention.

FIG. 20 is a screen shot of a graphical user interface (GUI) 2000 for creating a volume for a host from the virtual storage pool created in FIG. 17 according to an example embodiment of the present invention. As illustrated in FIG. 20, a user may select a host 2010 available for selection from the storage management API for which the volume is being created. The user also may select a virtual array 2020 on which the volume should be created (e.g., the "Boston" virtual storage array created in FIG. X), including a virtual storage pool 2030 from which the volume should be created (e.g., the "Block with Protection" virtual storage pool created on the "Boston" virtual storage array in FIG. 17). Further, the user may select a project (e.g., the "OracleDB" project created in FIG. 19) and provide a name 2050 and size 2060 for the volume being created.

Figure 21:
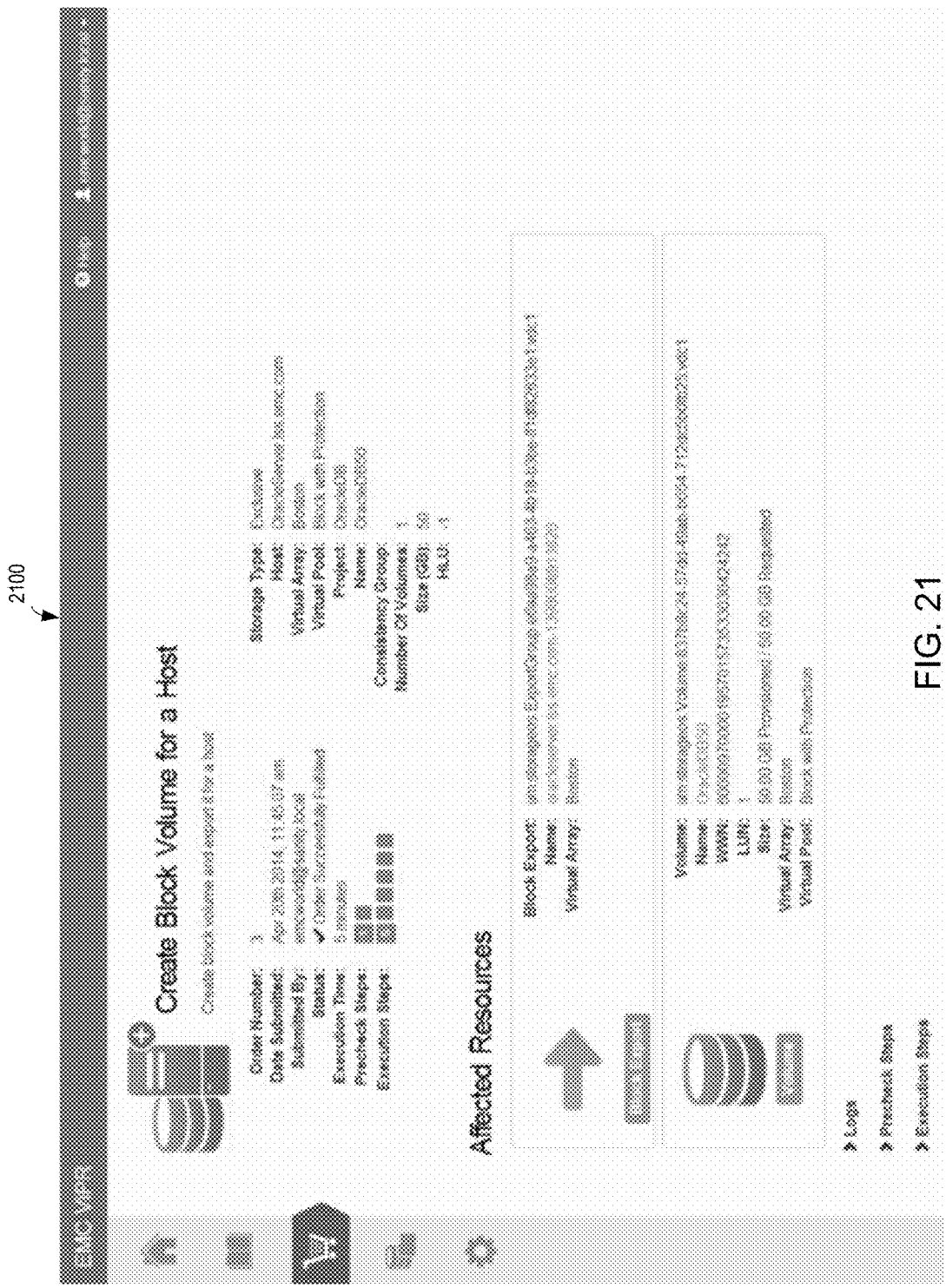
FIG. 21 is a screen shot of a graphical user interface illustrating a result of creating the volume for the host in FIG. 20 according to an example embodiment of the present invention.

FIG. 21 is a screen shot of a graphical user interface (GUI) 2100 illustrating a result of creating the volume for the host in FIG. 20 according to an example embodiment of the present invention. As illustrated in FIG. 21, the storage management API has orchestrated a number of steps in the background. First, the storage management created a source side (i.e., Site A) volume having the attributes provided in FIG. 20 named "OracleDB50" and has exported the volume to the specified host. Additionally, because the "OracleDB50" volume was created out of the "Block with Protection" virtual storage pool on the "Boston" virtual storage array, the storage management API also created a target side (i.e., Site B) data protection volume and added the "OracleDB50" and "OracleDB50-target-New York" volumes to an RDF group. The storage management API then exports the newly created volumes to the host provided when creating the volume in FIG. 20.

Figure 22:
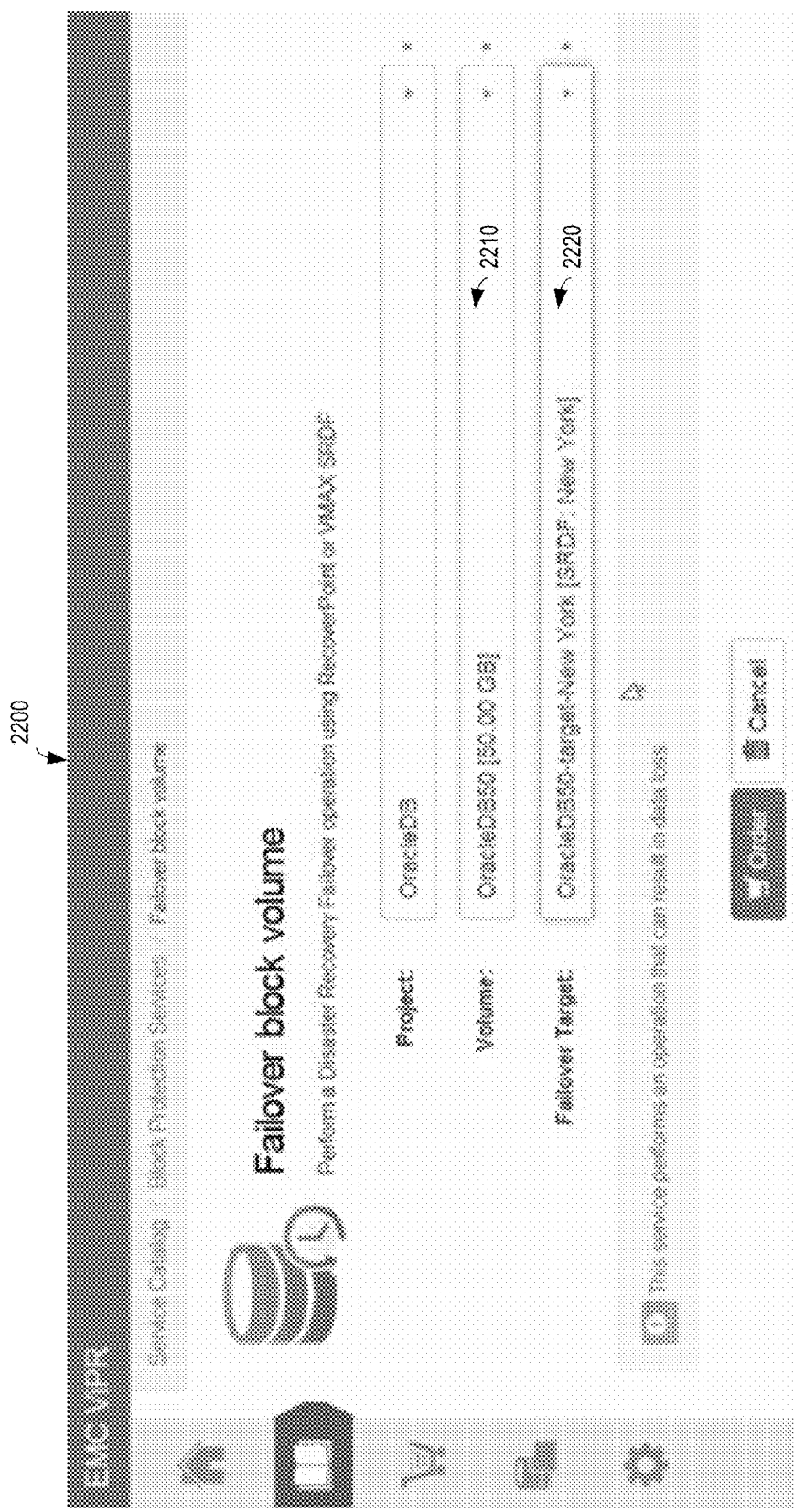
FIG. 22 is a screen shot of a graphical user interface for performing failover from a source volume to a target volume according to an example embodiment of the present invention.

FIG. 22 is a screen shot of a graphical user interface (GUI) 2200 for performing failover from a source volume (e.g., source device R1 630A of FIG. 6) to a target volume (e.g., target device R2 630B of FIG. 6) according to an example embodiment of the present invention. As illustrated in FIG. 22, a user may select a volume for failover 2210 (e.g., "OracleDB50") and a failover target 2220 (e.g., "OracleDB50-target-New York [SRDF: New York]").

Figure 23:
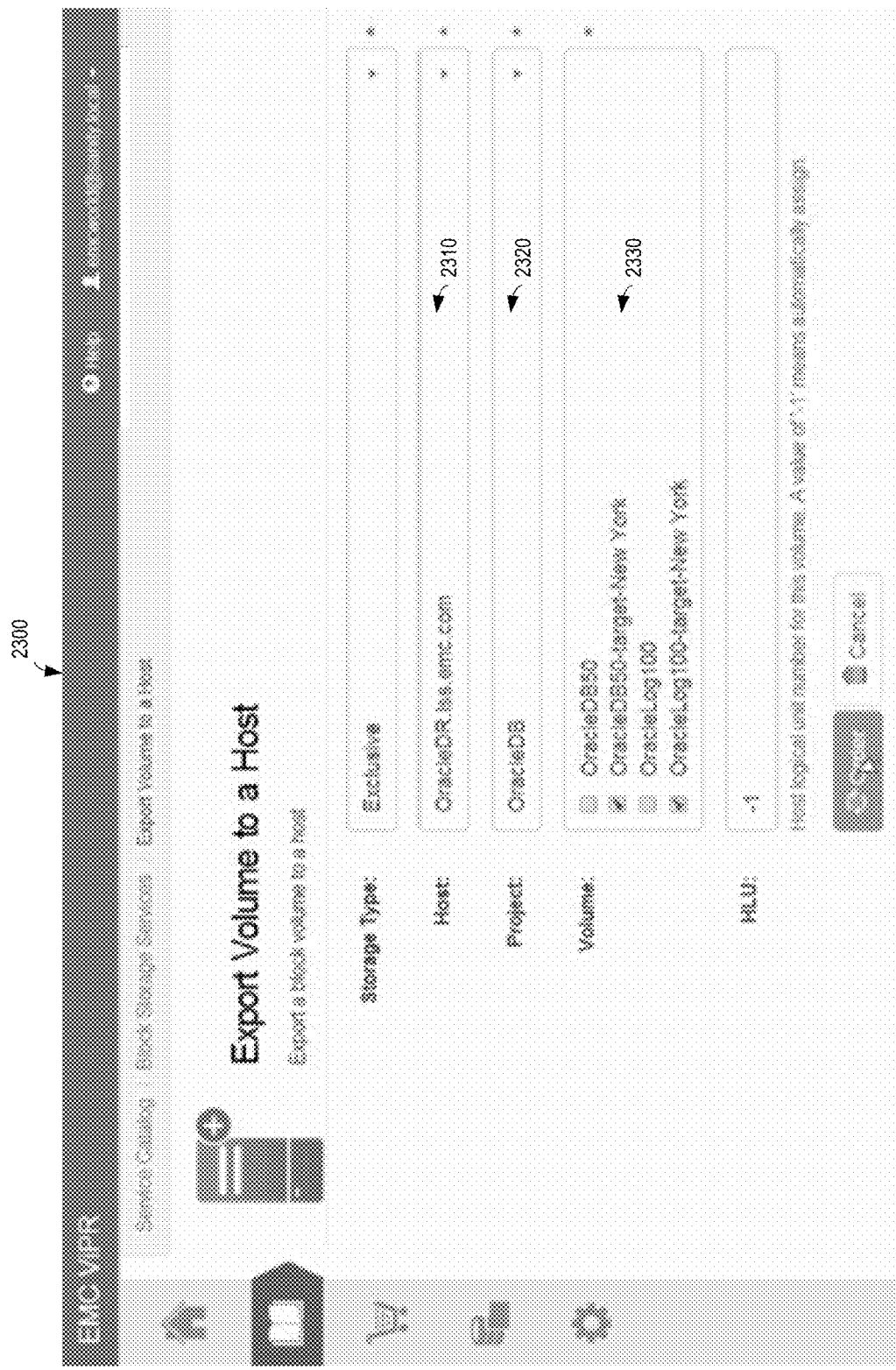
FIG. 23 is a screen shot of a graphical user interface for selecting volumes for failover and exporting them to a host according to an example embodiment of the present invention.

FIG. 23 is a screen shot of a graphical user interface (GUI) 2200 for selecting volumes for failover and exporting them to a host according to an example embodiment of the present invention. As illustrated in FIG. 23, when failover is complete, a user may mount the volumes to a host in the data recovery site (e.g., Site B). A user may select a host 2310 (e.g., "OracleDR.lss.emc.com" and a project 2320 (e.g., "OracleDB") available on the host, which causes a plurality of volumes available in the project 2230 to be displayed. The user then may select which volumes have been failed over (e.g., "OracleDB50-target-New York" and "OracleLog100-target-New York") and expose them to the selected host.

Figure 24:
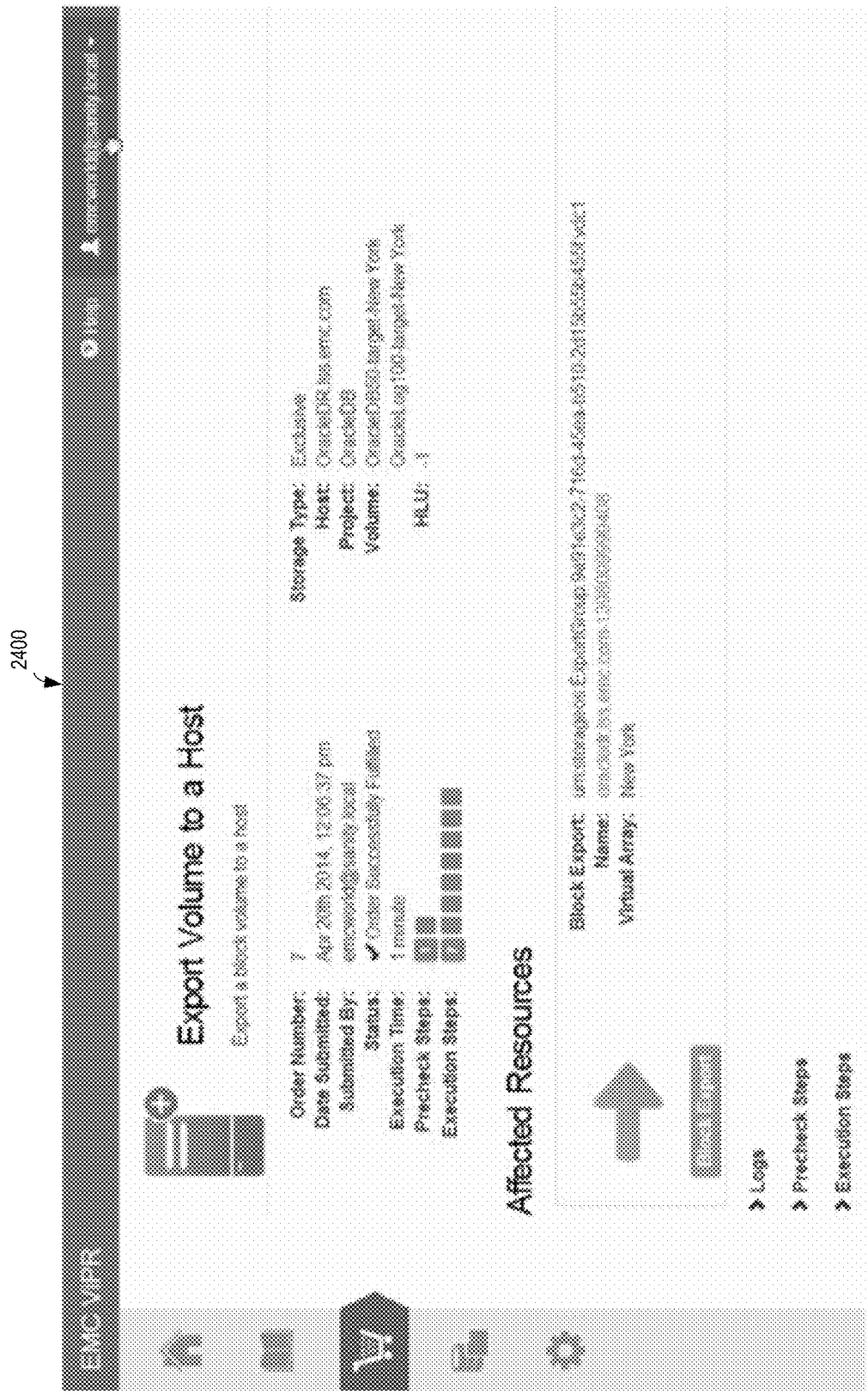
FIG. 24 is a screen shot of a graphical user interface illustrating a result of exporting the failed over volumes for the host in FIG. 23 according to an example embodiment of the present invention.

FIG. 24 is a screen shot of a graphical user interface (GUI) 2400 illustrating a result of exporting the failed over volumes for the host in FIG. 23 according to an example embodiment of the present invention. As illustrated in FIG. 24, "OracleDB50-target-New York" and "OracleLog100-target-New York" volumes are exposed to "OracleDR.lss.emc.com" for failover.

Figure 25:
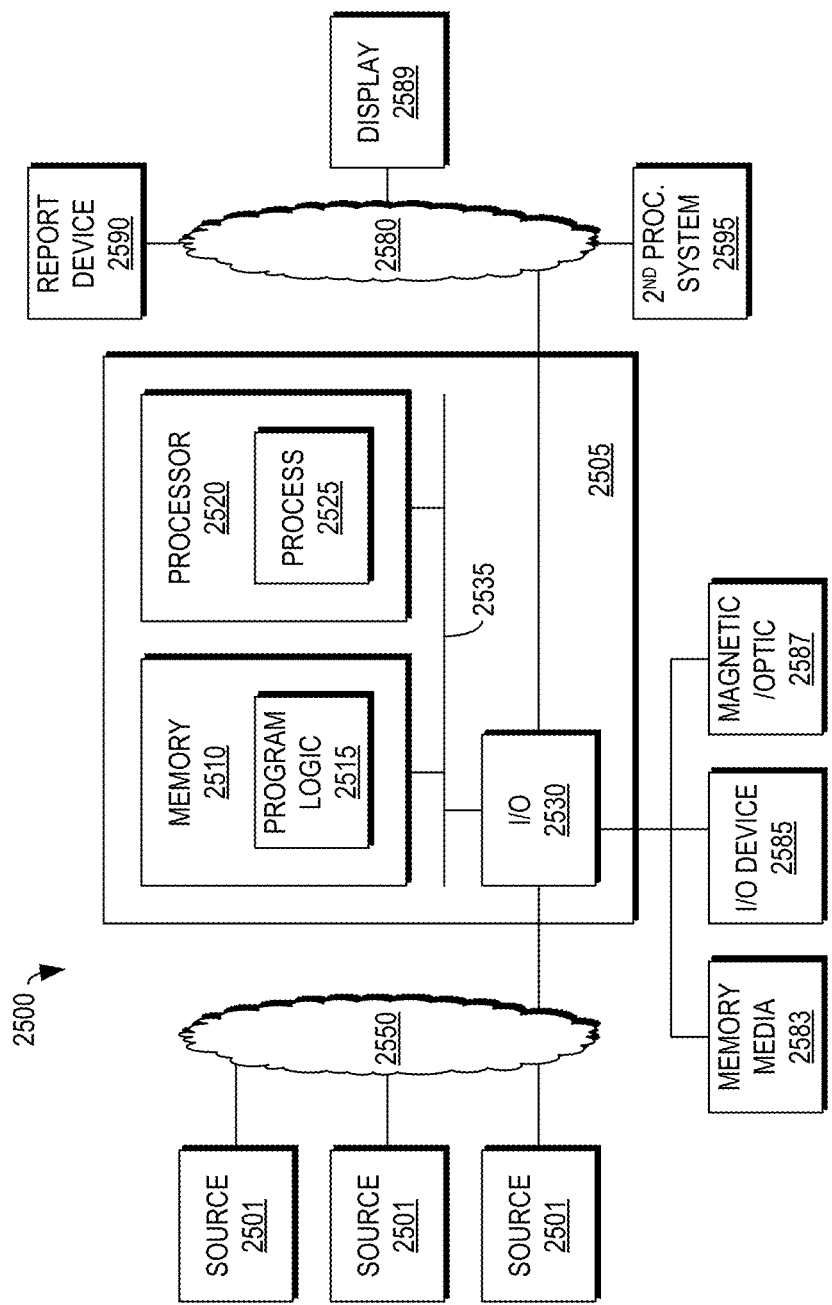
FIG. 25 is a block diagram of an apparatus according to an example embodiment the present invention.

FIG. 25 is a block diagram of an apparatus 2505 according to an example embodiment of the present invention. The apparatus 2505 may be part of a system 2500 and includes memory 2510 storing program logic 2515, a processor 2520 for executing a process 2525, and a communications I/O interface 2530, connected via a bus 2535.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 25, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 26:
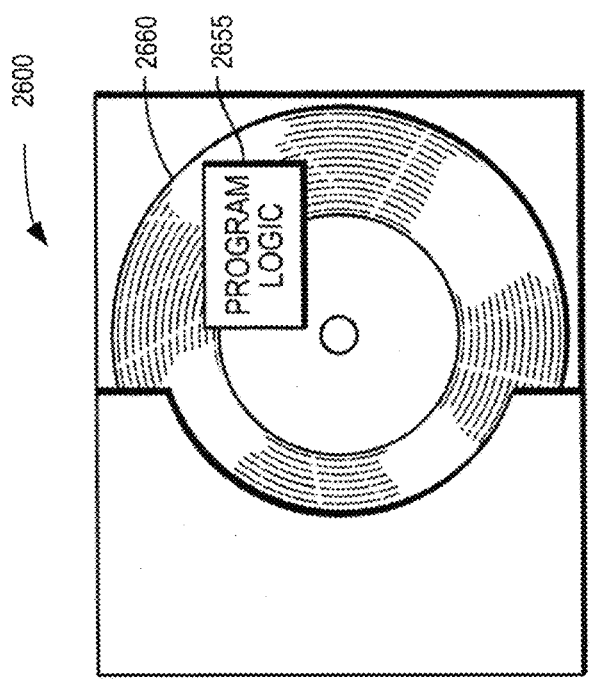
FIG. 26 is a block diagram of a computer program product including program logic, encoded on a computer-readable medium in computer-executable code configured for carrying out the methods of the invention, according to an example embodiment of the present invention.

FIG. 26 is a block diagram of a computer program product 2600 including program logic 2655, encoded on a computer-readable medium 2660 in computer-executable code configured for carrying out the methods of the invention, according to an example embodiment of the present invention. The logic for carrying out the method may be embodied as part of the aforementioned system, which is useful for carrying out a method described with reference to embodiments shown.

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage configuration and provisioning tasks. Such tasks may include, for example, configuring and provisioning storage for use with an email application. Tasks may include allocating storage, specifying the logical and/or physical devices used for the storage allocation, specifying whether the data should be replicated, the particular RAID (Redundant Array of Independent or Inexpensive Disks) level, and the like. With such options in connection with performing configuration and provisioning tasks, a customer may not have the appropriate level of sophistication and knowledge needed.

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Data striping is a technique of segmenting logically sequential data so that segments can be assigned to multiple disk drives or other physical devices in a round-robin fashion and thus written concurrently. Data striping may be used in connection with RAID (redundant array of independent disks) storage systems and may be useful in situations where a processor is capable of reading or writing data faster than a single disk can supply or accept it. Specifically, in connection with accessing data that has been striped, while one data segment is being transferred from the first disk, a second disk can locate the next segment. Known management systems allow for the adjustment of the coarseness of the striping pattern and data striping may be used separately from or in conjunction with data mirroring techniques. Advantages of striping include improvements in performance and throughput.

Logical devices containing the data that has been stored across multiple disk drives may be accessed at different frequencies. Access density is the ratio of performance, measured in I/Os per second, to the capacity of a disk drive, e.g., measured in gigabytes (Access Density=I/Os per second per gigabyte). Increasing capacity of a disk drive, without a corresponding improvement in performance at the drive level, creates a performance imbalance that may be characterized by the access density. In attempts to maintain acceptable performance levels as disks get larger, allocation levels within disks may be used that lead to inefficient utilization of the disks. That is, end-users may allocate less space per disk drive to maintain performance levels and may add more disk drives to support increased activity levels and capacity. These actions may add costs to the infrastructure and/or to operational expenses. Access density may be significant factor in managing storage system performance and the tradeoffs of using higher-capacity disks may be carefully evaluated in view of the possibility of lowering access performance versus adding higher performance disk drives that may be expensive. Users may balance performance, capacity and costs when considering how and whether to replace and/or modify a storage array.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
   receiving parameters for creation of a source volume for a host; and
   creating the source volume with data protection according to the received parameters by
      creating the source volume;
      creating a target volume;
      establishing a data protection group between the source volume and the target volume according to a data replication mode configured on a data protection policy configured for a replication group; and
      exporting the source volume to the host,
   wherein establishing the data protection group between the source volume and the target volume according to a data replication mode configured on a data protection policy configured for a replication group comprises:
      adding the source volume and the target volume to the replication group;
      initiating replication from the source volume to the target volume according to a policy; and
      masking the source volume and the target volume,
   wherein adding the source volume and the target volume to the replication group comprises associating a source storage array with a target storage array, a replication technology, and a storage pool representing storage that will be used for data replication,
   wherein defining the replication group comprises:
      selecting a source virtual storage array;
      selecting a target virtual storage array; and selecting a replication technology for data protection from the source virtual storage array to the target virtual storage array.

2. The method of claim 1
wherein selecting a source virtual storage array comprises selecting a source virtual storage pool on the source virtual storage array;
wherein selecting a target virtual storage array comprises selecting a target virtual storage pool on the target virtual storage array;
wherein selecting a replication technology for data protection from the source virtual storage array to the target virtual storage array comprises selecting the replication technology for data protection from the source virtual storage pool to the target virtual storage pool.

3. The method of claim 2
wherein selecting a source virtual storage pool on the source virtual storage array comprises defining the source virtual storage pool representing storage from which the source volume will be provisioned; and
wherein selecting a target virtual storage pool on the target virtual storage array comprises defining the target virtual storage pool representing storage from which the target volume will be provisioned.

4. The method of claim 3 wherein defining the virtual storage pool comprises:
selecting a virtual storage array on which the virtual storage pool will be defined; and
defining attributes for the storage system on which the virtual storage pool will be defined.

5. The method of claim 1 further comprising:
selecting the source volume for fail over; and
initiating fail over of the source volume to the target volumes to cause the target volume to be enabled for host I/O writes.

6. The method of claim 5 further comprising initiating failover of the target volume to the source volume to cause the source volume to be enabled for host I/O writes.

7. The method of claim 1 further comprising:
selecting the source volume for a parameter change; and
initiating change of the source volume parameter to cause the source volume and the target volume, as members of the data protection group, to both be affected by the parameter change and maintain the data protection group.

8. A system comprising:
a first virtual storage array;
a second virtual storage array; and
computer executable logic configured to enable one or more processors of the system to perform operations of:
receiving parameters for creation of a source volume for a host; and
creating the source volume with data protection according to the received parameters by
creating the source volume;
creating a target volume;
establishing a data protection group between the source volume and the target volume according to a data replication mode configured on a data protection policy configured for a replication group; and
exporting the source volume to the host,
wherein establishing the data protection group between the source volume and the target volume according to a data replication mode configured on a data protection policy configured for a replication group comprises:

adding the source volume and the target volume to the replication group;
initiating replication from the source volume to the target volume according to a policy; and
masking the source volume and the target volume,
wherein adding the source volume and the target volume to the replication group comprises associating a source storage array with a target storage array, a replication technology, and a storage pool representing storage that will be used for data replication,
wherein defining the replication group comprises:
selecting a source virtual storage array;
selecting a target virtual storage array; and
selecting a replication technology for data protection from the source virtual storage array to the target virtual storage array.

9. The system of claim 8
wherein selecting a source virtual storage array comprises selecting a source virtual storage pool on the source virtual storage array;
wherein selecting a target virtual storage array comprises selecting a target virtual storage pool on the target virtual storage array;
wherein selecting a replication technology for data protection from the source virtual storage array to the target virtual storage array comprises selecting the replication technology for data protection from the source virtual storage pool to the target virtual storage pool.

10. The system of claim 9
wherein selecting a source virtual storage pool on the source virtual storage array comprises defining the source virtual storage pool representing storage from which the source volume will be provisioned; and
wherein selecting a target virtual storage pool on the target virtual storage array comprises defining the target virtual storage pool representing storage from which the target volume will be provisioned.

11. The system of claim 10 wherein defining the virtual storage pool comprises:
selecting a virtual storage array on which the virtual storage pool will be defined; and
defining attributes for the storage system on which the virtual storage pool will be defined.

12. The system of claim 8 further comprising:
selecting the source volume for fail over; and
initiating fail over of the source volume to the target volumes to cause the target volume to be enabled for host I/O writes.

13. The system of claim 12 further comprising initiating failover of the target volume to the source volume to cause the source volume to be enabled for host I/O writes.

14. The system of claim 8 further comprising:
selecting the source volume for a parameter change; and
initiating change of the source volume parameter to cause the source volume and the target volume, as members of the data protection group, to both be affected by the parameter change and maintain the data protection group.

15. A computer program product including a non-transitory computer readable storage medium have computer program code encoded thereon that, when executed on one or more processors of a system, causes the system to create volumes with data protection, the computer program code comprising:
computer program code for receiving parameters for creation of a source volume for a host; and computer program code for creating the source volume with data protection according to the received parameters by:
  creating the source volume;
  creating a target volume;
  establishing a data protection group between the source volume and the target volume according to a data replication mode configured on a data protection policy configured for a replication group; and
  exporting the source volume to the host,
wherein establishing the data protection group between the source volume and the target volume according to a data replication mode configured on a data protection policy configured for a replication group comprises:
adding the source volume and the target volume to the replication group;
initiating replication from the source volume to the target volume according to a policy; and
masking the source volume and the target volume,
wherein adding the source volume and the target volume to the replication group comprises associating a source storage array with a target storage array, a replication technology, and a storage pool representing storage that will be used for data replication,
wherein defining the replication group comprises:
  selecting a source virtual storage array;
  selecting a target virtual storage array; and
  selecting a replication technology for data protection from the source virtual storage array to the target virtual storage array.

* * * * *